United States Patent
Drummond

(10) Patent No.: US 12,365,549 B2
(45) Date of Patent: Jul. 22, 2025

(54) CONVEYOR TRANSFER GUARDS

(71) Applicant: Flexible Steel Lacing Company, Downers Grove, IL (US)

(72) Inventor: Andrew Drummond, Grand Rapids, MI (US)

(73) Assignee: Flexible Steel Lacing Company, Downers Grove, IL (US)

(*) Notice: Subject to any disclaimer, the term of this patent is extended or adjusted under 35 U.S.C. 154(b) by 203 days.

(21) Appl. No.: 18/125,417

(22) Filed: Mar. 23, 2023

(65) Prior Publication Data

US 2023/0303339 A1 Sep. 28, 2023

Related U.S. Application Data

(60) Provisional application No. 63/323,960, filed on Mar. 25, 2022.

(51) Int. Cl.
*B65G 47/66* (2006.01)
(52) U.S. Cl.
CPC .................................. *B65G 47/66* (2013.01)
(58) Field of Classification Search
CPC ..................................................... B65G 47/66
See application file for complete search history.

(56) References Cited

U.S. PATENT DOCUMENTS

| | | | |
|---|---|---|---|
| 2,232,081 A | 2/1941 | Sloane | |
| 2,237,345 A | 4/1941 | Frentzel, Jr. et al. | |
| 2,268,724 A | 1/1942 | Shackelford | |
| 2,517,983 A | 8/1950 | Crosland | |
| 2,536,961 A | 1/1951 | Smith | |
| 2,624,444 A | 1/1953 | Casabona | |
| 2,627,960 A | 2/1953 | Eberle | |
| 2,862,599 A | 12/1958 | Sinden | |

(Continued)

FOREIGN PATENT DOCUMENTS

| CN | 1135668 | 11/1996 |
|---|---|---|
| CN | 2420247 | 2/2001 |

(Continued)

OTHER PUBLICATIONS

JP-2005261873-A (Year: 2005).*

(Continued)

*Primary Examiner* — Gene O Crawford
*Assistant Examiner* — Lester Rushin, III
(74) *Attorney, Agent, or Firm* — Fitch, Even, Tabin & Flannery LLP

(57) ABSTRACT

In one aspect of the present disclosure, a transfer guard member is provided for a transfer guard system. The transfer guard member has a unitary, one-piece body configured to connect to an elongate mounting member, an upper surface of the body, and an array of protrusions to support an object. The array of protrusions includes columns of protrusions each comprising a plurality of the protrusions aligned in a first direction. The array of protrusions includes first spacings extending in the first direction between the protrusions of each of the columns. The array of protrusions also includes second spacings extending in a second direction transverse to the first direction between the adjacent columns. The first spacings and the second spacings are each less than twice a height of the protrusions.

35 Claims, 17 Drawing Sheets

(56) References Cited

U.S. PATENT DOCUMENTS

| | | |
|---|---|---|
| 2,899,086 A | 8/1959 | Saint-Andre |
| D209,071 S | 10/1967 | Koch |
| 3,345,957 A | 10/1967 | Welch |
| D209,421 S | 11/1967 | Fabian |
| 3,465,489 A | 9/1969 | Monaghan |
| 3,548,996 A | 12/1970 | Ellis |
| 3,587,674 A | 6/1971 | Adkin |
| 3,623,598 A | 11/1971 | Anfossi |
| 3,738,650 A | 6/1973 | Ossenkop et al. |
| 3,878,735 A | 4/1975 | Preuss |
| 3,988,880 A | 11/1976 | Miyazaki et al. |
| 4,096,943 A | 6/1978 | Gentsch |
| 4,132,304 A | 1/1979 | Gent |
| 4,288,208 A | 9/1981 | Kusters |
| 4,579,219 A | 4/1986 | Burkhardt |
| 4,613,036 A | 9/1986 | Bourgeois |
| 4,718,543 A | 1/1988 | Leisner et al. |
| D303,974 S | 10/1989 | Karr |
| 4,901,845 A | 2/1990 | Zoergiebel |
| 4,989,723 A | 2/1991 | Bode et al. |
| 5,009,307 A | 4/1991 | Chance et al. |
| 5,044,485 A | 9/1991 | Loder |
| 5,065,222 A | 11/1991 | Ishii |
| 5,215,182 A | 6/1993 | Garbagnati |
| 5,311,982 A | 5/1994 | Clopton |
| 5,311,983 A | 5/1994 | Clopton |
| 5,320,478 A | 6/1994 | Gonsowski et al. |
| 5,324,582 A * | 6/1994 | Goto ............... G11B 5/70684 |
| 5,344,001 A | 9/1994 | Kawaai et al. |
| 5,409,096 A | 4/1995 | Clopton |
| 5,584,373 A | 12/1996 | Layne |
| 5,597,062 A | 1/1997 | Biwer |
| 5,597,063 A | 1/1997 | Bogle et al. |
| 5,695,042 A | 12/1997 | van der Burgt |
| D407,174 S | 3/1999 | Baker |
| 5,957,265 A | 9/1999 | Clopton |
| 5,971,129 A | 10/1999 | Stawniak et al. |
| D419,742 S | 1/2000 | Abbestam |
| 6,138,819 A | 10/2000 | Bogle et al. |
| 6,164,435 A | 12/2000 | Coen et al. |
| 6,550,604 B2 | 4/2003 | Maclachlan |
| 6,589,631 B1 | 7/2003 | Suzuki |
| 6,630,633 B1 | 10/2003 | Uber et al. |
| D483,168 S | 12/2003 | McDaniel |
| D484,545 S | 12/2003 | McIlvaine |
| D493,933 S | 8/2004 | Schwagermann |
| 6,848,583 B2 | 2/2005 | Largent |
| 6,896,122 B2 | 5/2005 | Gambrell et al. |
| 6,959,803 B1 | 11/2005 | Layne et al. |
| 7,137,505 B2 | 11/2006 | Stebnicki |
| 7,210,569 B1 | 5/2007 | Tarhan et al. |
| D547,523 S | 7/2007 | Swinderman |
| 7,258,225 B2 | 8/2007 | Hall |
| D553,824 S | 10/2007 | Rijksen |
| 7,287,640 B1 | 10/2007 | Schmutzler |
| 7,413,088 B2 | 8/2008 | Temler |
| 7,523,820 B1 | 4/2009 | Wu et al. |
| D611,673 S | 3/2010 | Andrews |
| 7,673,732 B2 | 3/2010 | Underberg |
| 7,721,874 B2 | 5/2010 | Chen |
| 7,882,944 B1 | 2/2011 | Eubanks |
| D635,847 S | 4/2011 | Olsson |
| D643,709 S | 8/2011 | Olsson |
| 8,042,682 B2 | 10/2011 | Ertel |
| D650,143 S | 12/2011 | Bhosale |
| 8,162,133 B2 | 4/2012 | Ruge |
| 8,196,736 B2 | 6/2012 | Wagner |
| 8,210,341 B2 | 7/2012 | Marshall et al. |
| 8,365,899 B2 | 2/2013 | McKee |
| 8,567,591 B2 | 10/2013 | Angel |
| 9,022,207 B2 | 5/2015 | Tully et al. |
| 9,022,210 B2 | 5/2015 | Tully |
| 9,027,738 B2 | 5/2015 | Coen |
| 9,290,333 B2 | 3/2016 | Skanse |
| 9,452,896 B2 | 9/2016 | Lee |
| 9,550,625 B2 | 1/2017 | Specht |
| D780,399 S | 2/2017 | Pettinga |
| 9,643,784 B2 | 5/2017 | Guerra |
| 9,663,306 B2 | 5/2017 | Pettinga |
| D789,643 S | 6/2017 | Pettinga |
| 9,694,987 B1 | 7/2017 | Schroader |
| 9,758,317 B2 | 9/2017 | Sammauro |
| D819,921 S | 6/2018 | Pettinga |
| 10,092,122 B2 | 10/2018 | Bing |
| 10,112,131 B2 | 10/2018 | Yoon |
| 10,233,035 B2 * | 3/2019 | Pettinga ................ B65G 47/66 |
| 10,343,853 B2 | 7/2019 | Yasinski |
| 10,376,938 B2 | 8/2019 | Frauenhuber |
| 10,427,891 B2 | 10/2019 | McKee |
| 10,556,755 B2 | 2/2020 | Pettinga |
| 10,646,898 B2 | 5/2020 | Hillerich, Jr. |
| 10,654,652 B1 | 5/2020 | Folickman |
| 10,913,616 B2 | 2/2021 | Pettinga |
| 10,926,955 B1 | 2/2021 | Malina |
| 11,136,194 B2 | 10/2021 | Sathiyanarayanan |
| 11,186,448 B2 | 11/2021 | Pettinga |
| 11,597,604 B1 | 3/2023 | Simon |
| 11,597,608 B2 | 3/2023 | Pettinga |
| 11,629,010 B1 | 4/2023 | Defant |
| 11,661,283 B2 | 5/2023 | Pettinga |
| 11,713,199 B2 | 8/2023 | Pettinga |
| 12,065,313 B2 | 8/2024 | Pettinga |
| 12,071,314 B2 | 8/2024 | Pettinga |
| 2005/0173858 A1 | 8/2005 | Temler et al. |
| 2006/0070966 A1 | 4/2006 | Koudys et al. |
| 2006/0108204 A1 | 5/2006 | Marsetti |
| 2007/0023257 A1 | 2/2007 | Schiesser |
| 2008/0296129 A1 | 12/2008 | Yagi et al. |
| 2009/0084659 A1 | 4/2009 | Underberg |
| 2010/0108467 A1 | 5/2010 | Barreyre et al. |
| 2010/0230247 A1 | 9/2010 | McKee |
| 2011/0132725 A1 | 6/2011 | Marshall et al. |
| 2014/0182733 A1 | 7/2014 | Mettee, II |
| 2014/0183002 A1 | 7/2014 | Tully |
| 2014/0183006 A1 | 7/2014 | Tully |
| 2014/0262684 A1 | 9/2014 | Skanse |
| 2015/0291368 A1 | 10/2015 | Pettinga |
| 2016/0214154 A1 | 7/2016 | Frauenhuber |
| 2017/0008705 A1 | 1/2017 | Sammauro |
| 2017/0055749 A1 | 3/2017 | Bing |
| 2017/0174444 A1 | 6/2017 | Schroader |
| 2017/0246564 A1 | 8/2017 | Yoon |
| 2017/0275102 A1 | 9/2017 | Pettinga |
| 2018/0265309 A1 | 9/2018 | Yasinski |
| 2018/0345324 A1 | 12/2018 | Hillerich, Jr. |
| 2019/0002209 A1 | 1/2019 | McKee |
| 2020/0346868 A1 | 11/2020 | Sathiyanarayanan |
| 2021/0101757 A1 * | 4/2021 | Pettinga ................ B65G 47/66 |
| 2021/0179365 A1 | 6/2021 | Pettinga |
| 2022/0089374 A1 | 3/2022 | Pettinga |
| 2022/0162016 A1 | 5/2022 | Pettinga |
| 2023/0098268 A1 | 3/2023 | Pettinga |
| 2023/0102050 A1 | 3/2023 | Pettinga |

FOREIGN PATENT DOCUMENTS

| | | |
|---|---|---|
| CN | 101056807 A | 10/2007 |
| CN | 101074070 A | 11/2007 |
| CN | 101880126 A | 11/2010 |
| CN | 102695662 A | 9/2012 |
| CN | 102887423 A | 1/2013 |
| CN | 203448352 U | 2/2014 |
| CN | 104870340 A | 8/2015 |
| CN | 110691744 | 1/2020 |
| CN | 112010006 A | 12/2020 |
| DE | 3014608 | 10/1981 |
| DE | 3224557 | 1/1984 |
| DE | 8700878 | 3/1987 |
| DE | 9212012 U1 | 12/1992 |
| DE | 19858521 | 6/2000 |
| DE | 202006003116 | 4/2006 |
| EP | 0156113 | 10/1985 |
| EP | 0290255 | 11/1988 |
| EP | 0778229 | 6/1997 |

(56) References Cited

FOREIGN PATENT DOCUMENTS

| | | |
|---|---|---|
| EP | 0906879 | 4/1999 |
| EP | 0919493 | 6/1999 |
| EP | 2332865 A1 | 6/2011 |
| FR | 1561799 | 3/1969 |
| GB | 842230 | 7/1960 |
| GB | 1116571 | 6/1968 |
| GB | 1352993 | 5/1974 |
| JP | H07248011 | 9/1995 |
| JP | H08133459 A | 5/1996 |
| JP | H115264 | 1/1999 |
| JP | H11199038 | 7/1999 |
| JP | 2000177836 | 6/2000 |
| JP | 2001233447 A | 8/2001 |
| JP | 2005261873 A | 9/2005 |
| JP | 2007155007 | 6/2007 |
| JP | 5181355 | 4/2013 |
| JP | 2019210100 | 12/2019 |
| KR | 101299596 | 8/2013 |
| NL | 2002344 | 6/2010 |
| SU | 590213 | 1/1978 |
| SU | 1159859 | 6/1985 |
| SU | 1328266 | 8/1987 |
| WO | 9856694 A1 | 12/1998 |
| WO | 2011071743 | 6/2011 |
| WO | 2014106062 | 7/2014 |
| WO | 2017111976 | 6/2017 |
| WO | 2018191122 | 10/2018 |
| WO | 2020216783 | 10/2020 |

OTHER PUBLICATIONS

U.S. Appl. No. 29/898,156, filed Jul. 24, 2023, 10 pages.
U.S. Appl. No. 63/528,572, filed Jul. 24, 2023, 25 pages.
U.S. Appl. No. 18/198,942, filed May 18, 2023, 39 pages.
Notification of Transmittal of the International Search Report and the Written Opinion of the International Searching Authority, or the Declaration issued in related International Application No. PCT/US2023/016011 on Jun. 26, 2023, 14 pages.
U.S. Appl. No. 18/117,076, filed Mar. 3, 2023; 84 pages.
U.S. Appl. No. 18/213,678, filed Jun. 23, 2023.
Design U.S. Appl. No. 29/829,490, filed Mar. 4, 2022; 24 pages.
U.S. Appl. No. 18/781,174, filed Jul. 23, 2024, entitled "Conveyor Gap Blocker"; 45 pages.
U.S. Appl. No. 18/813,933, filed Aug. 23, 2024, entitled "Conveyor Transfer Guards"; 136 pages.

* cited by examiner

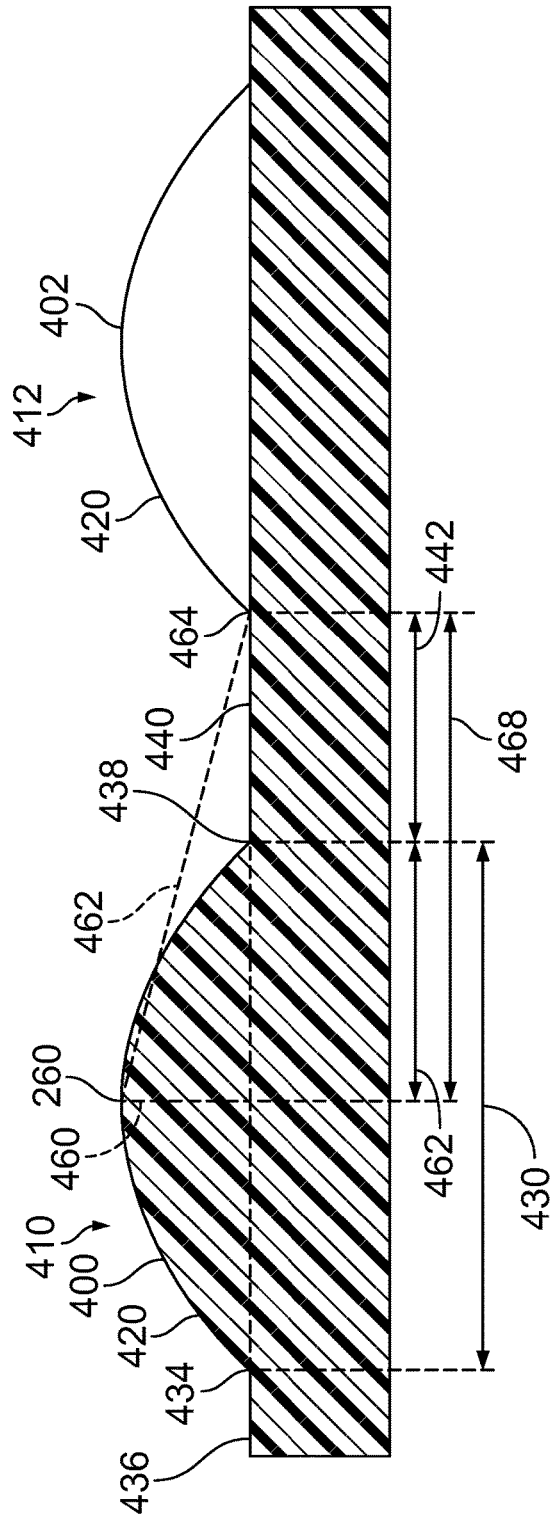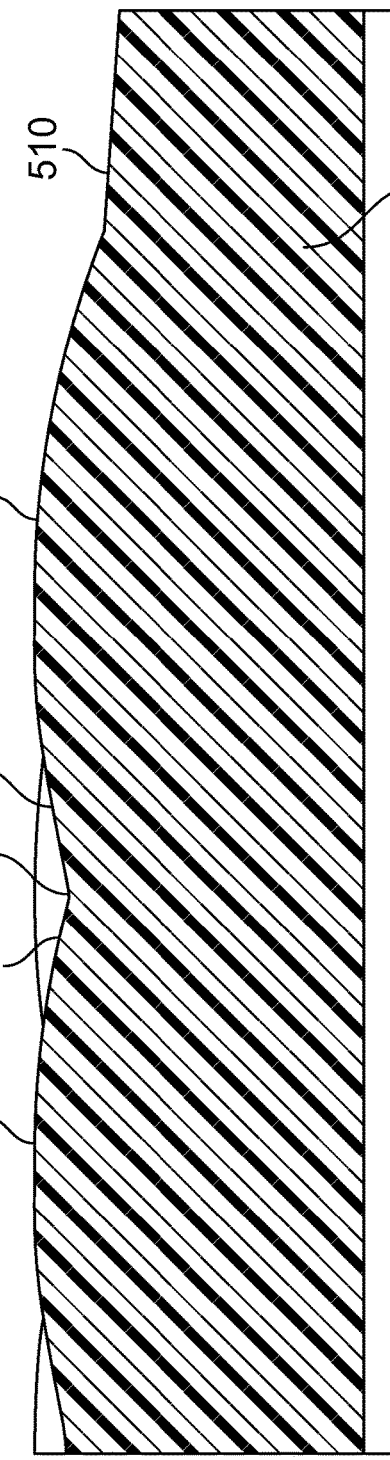
FIG. 13
FIG. 14

CONVEYOR TRANSFER GUARDS

CROSS-REFERENCE TO RELATED APPLICATION

This application claims the benefit of U.S. Provisional Patent Application No. 63/323,960, filed Mar. 25, 2022, which is hereby incorporated by reference.

FIELD

This disclosure relates to conveyors and, more specifically, to transfer guard systems for transferring objects across gaps between conveying surfaces.

BACKGROUND

Transfer guard systems are known for transferring objects downstream in a longitudinal travel direction across gaps between conveying surfaces, such as between conveyor belts. For example, U.S. Pat. No. 10,233,035 discloses transfer guard systems that may be utilized to facilitate transfer of an object across a gap between conveying surfaces, such as a gap between upstream and downstream conveyor belts, a gap across a hitch in a conveyor belt, or a gap between a conveyor belt and a chute as some examples.

Some of the transfer guard systems disclosed in the '035 patent utilize an elongate mounting member that is positioned to extend laterally in a gap between conveying surfaces and pairs of upstream and downstream transfer guard members that are connected to the mounting member. For example, the transfer guard member of FIG. 46 of the '035 patent has a relatively short longitudinal extent such that the transfer guard member of FIG. 46 is well-suited for use in applications where the gap between conveying surfaces is less than 3 inches, for example.

The transfer guard member of FIG. 46 of the '035 patent also has an upper surface with bumps to reduce friction between the transfer guard member and an object moving across the upper surface thereof. The bumps reduce friction between the transfer guard member and the object by reducing the surface area of the transfer guard member that contacts the object.

Objects, such as boxes or other containers, often have labels with shipping information adhered to the objects. For larger longitudinal gaps between conveying surfaces, such as four inches or longer, an object will have to travel longitudinally along an associated transfer guard member or members spanning the gap a longer distance than if the gap were shorter. The longer longitudinal distance traversed by the object, the greater the likelihood of a label of the object coming off and adhering to an upper surface of the transfer guard member.

SUMMARY

In one aspect of the present disclosure, a transfer guard member is provided for a transfer guard system. The transfer guard member has a unitary, one-piece body configured to connect to an elongate mounting member. The body includes an upper surface and an array of protrusions to support an object. The protrusions each have a curved surface projecting upwardly from the upper surface and a height above the upper surface. The array of protrusions includes columns of the protrusions, each column of the protrusions aligned in a first direction. The array of protrusions includes first spacings extending in the first direction between the protrusions of each of the columns. The array of protrusions further includes second spacings extending in a second direction transverse to the first direction between adjacent columns. The first spacings and the second spacings are each less than twice the height of the protrusions. In this manner, the protrusions are tightly arranged to minimize the surface area of the upper surface between the protrusions that a label of an object may adhere to as the object travels along the transfer guard member.

The present disclosure also provides a transfer guard member having a body to be positioned in a gap of a conveyor system, an upper surface of the body, and an inboard attachment portion of the body configured to be detachably fixed to an elongate mounting member extending laterally in the gap. The body has an outboard portion extending longitudinally outward from the inboard attachment portion and a receiving recess adjacent the inboard attachment portion configured for receiving an attachment portion of another transfer guard member fixed to the elongate mounting member so that the upper surfaces of the transfer guard members are adjacent one another.

The body further includes protrusions projecting upward from the upper surface to support an object being conveyed longitudinally by the conveyor system. The protrusions are arranged in columns, with each column of the protrusions comprising a plurality of protrusions aligned in a first direction. Each of the columns of protrusions has a longitudinally inboard endmost protrusion longitudinally spaced from an inboard end surface portion of the attachment portion by a longitudinal distance. The longitudinal distance causes the longitudinally inboard endmost protrusions to be longitudinally spaced from the other transfer guard member when the transfer guard members are fixed to the elongate mounting member. Further, at least one of the columns of the protrusions has first spacings extending in the first direction between the protrusions of the at least one column that are each less than the longitudinal distance between the longitudinally inboard endmost protrusion of the at least one column and the inboard end surface portion. The longitudinal distance between the longitudinally inboard endmost protrusions and the inboard end surface portion is relatively short to position the columns of protrusions to keep the object supported on the protrusions as the object transfers between the transfer guard members fixed to the elongate mounting member. Further, the narrow first spacings in the first direction between the protrusions of the at least one column are each less than the longitudinal distance which minimizes the surface area of the upper surface between the protrusions in the first direction and reduces the risk of object labels adhering to the upper surface between the protrusions.

In accordance with another aspect, a transfer guard system is provided that includes an elongate mounting member and at least one mount to position the elongate mounting member to extend laterally in a gap between conveying surfaces. The system includes transfer guard members configured to be connected to the elongate mounting member. The transfer guard members have outboard portions to be positioned proximate conveying surfaces. The transfer guard members have upper surfaces and a plurality of columns of protrusions, the protrusions having rounded surfaces that project upward from the upper surfaces. At least one of the outboard portions of the transfer guard members include conjoined protrusions of the columns of the protrusions. The conjoined protrusions include an inboard conjoined protrusion having a first length and an outboard conjoined protrusion having a second length longer than the first length. The conjoined protrusions have a juncture between the rounded surfaces of the conjoined protrusions. Further, the longer outboard conjoined protrusion provides an enlarged rounded outer surface to support an object as the object travels onto or off of the transfer guard members.

BRIEF DESCRIPTION OF THE DRAWINGS

FIG. 13 is an enlarged view of a portion of FIG. 12 showing a lateral spacing between columns of longitudinally aligned protrusions;

FIG. 14 is a cross-sectional view taken across line 14-14 in FIG. 9 showing curved surfaces of the conjoined protrusions meeting at a juncture of the protrusions so that the conjoined protrusions lack any longitudinal spacing therebetween;

DETAILED DESCRIPTION

Figure 1:
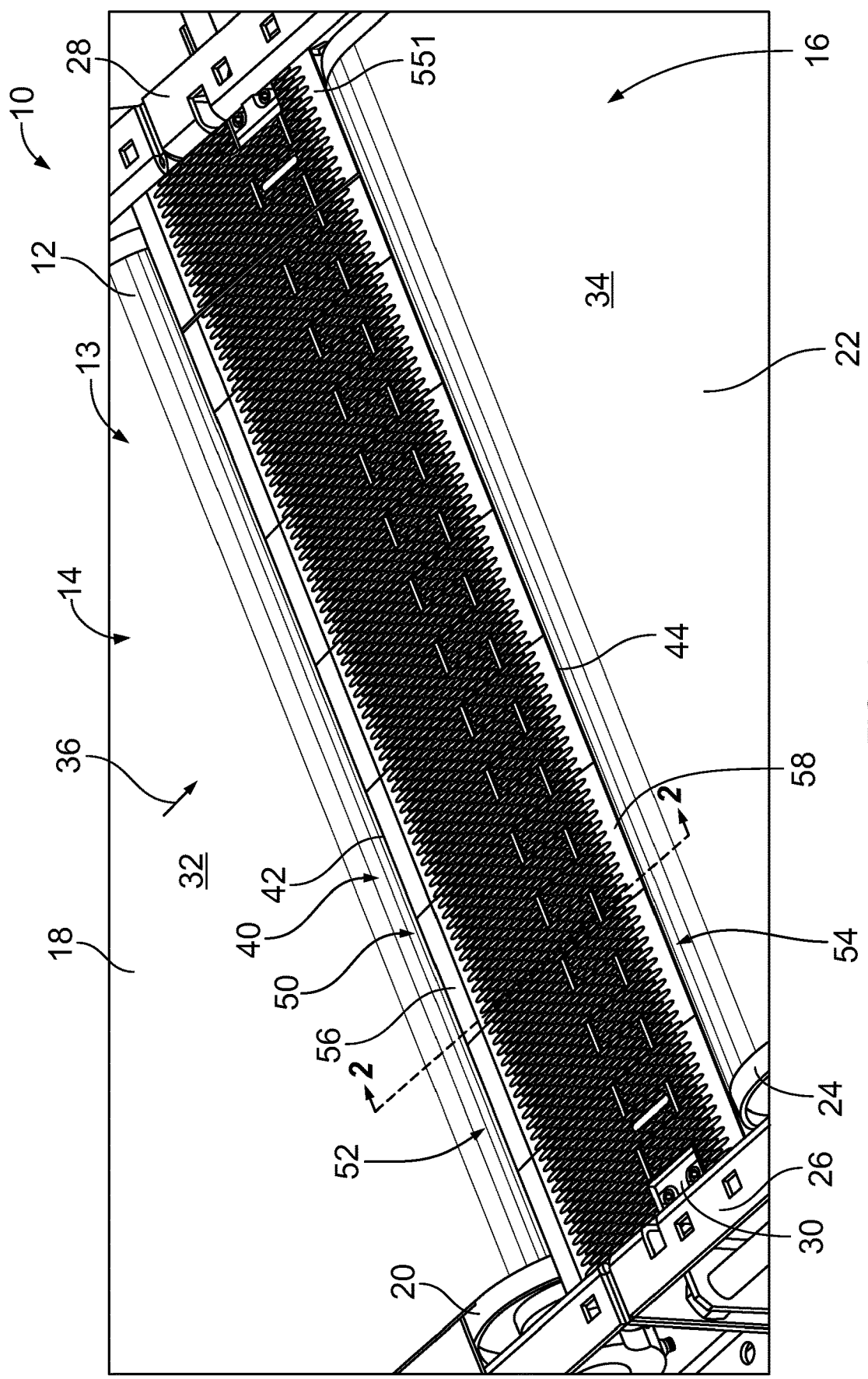
FIG. 1 is a perspective view of a transfer guard system installed in a gap between upstream and downstream conveyors.

As shown in FIG. 1, a transfer guard system 10 is provided that facilitates conveying of an object across a gap 12 between an upstream conveyor 14 and a downstream conveyor 16 of a conveyor system 13. The upstream conveyor 14 has a conveyor belt 18, a tail pulley 20, and a head pulley. The downstream conveyor 16 has a conveyor belt 22, a head pulley 24, and a tail pulley. The conveyor system 13 has a frame including frame portions 26, 28 supporting the pulleys 20, 24 and conveyor belts 18, 22. The transfer guard system 10 is secured to the frame portions 26, 28 via mounts 30 (see FIG. 15) at or adjacent opposite lateral sides of the gap 12. The conveyor belts 18, 22 have outer surfaces 32, 34 for supporting objects thereon as the conveyor belts 18, 16 move to convey the objects in a downstream longitudinal direction 36. The transfer guard system 10 has transfer guard members 40 with outboard edges 42, 44 positioned proximate the outer surfaces 32, 34 of the conveyor belts 18, 22 to transition objects onto and off of the transfer guard members 40.

Figure 3:
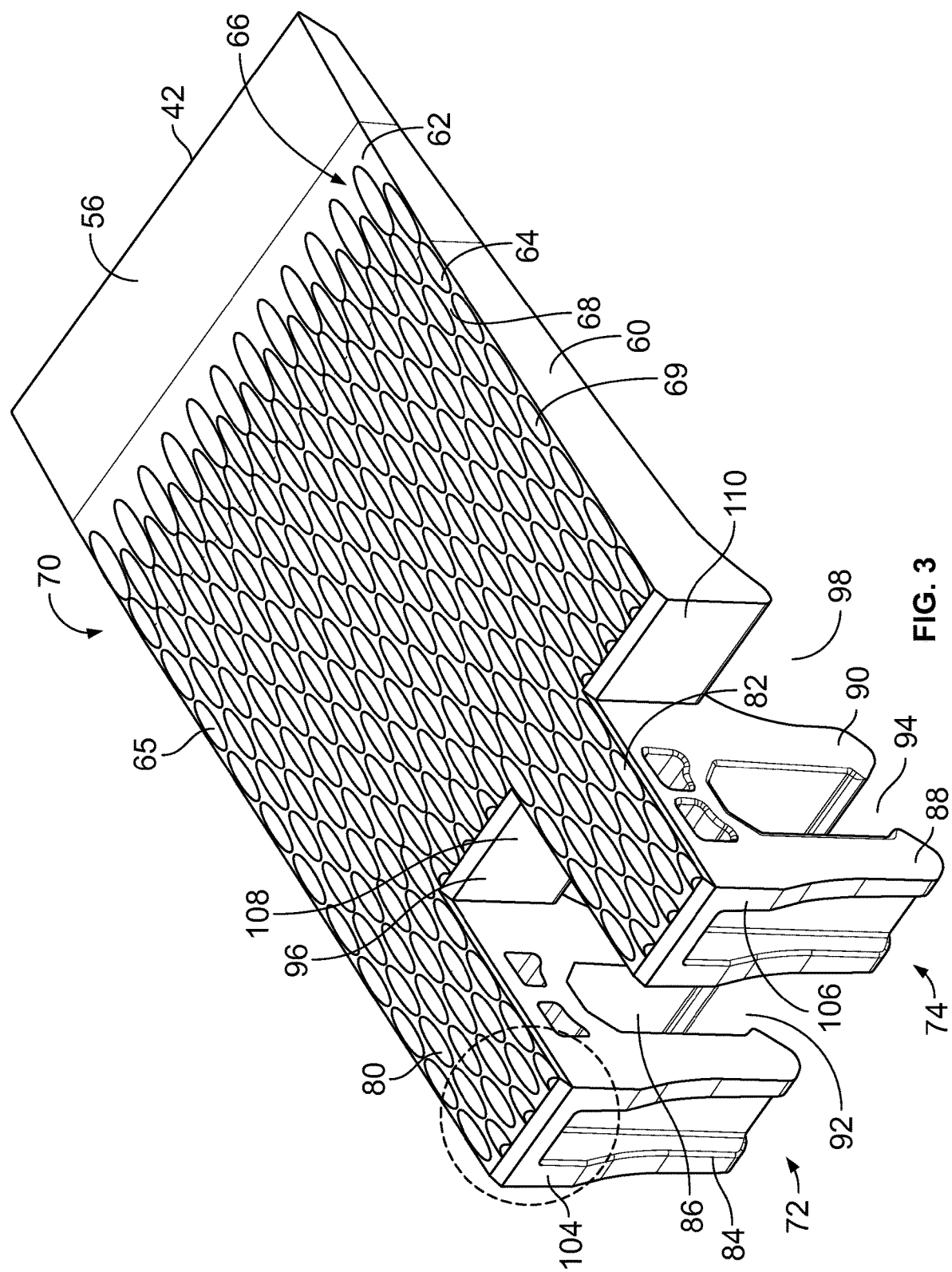
FIG. 3 is a perspective view of the upstream transfer guard member of FIG. 2 showing a pair of attachment portions of the transfer guard member each having a pair of leg portions to engage the mounting member and receiving recesses laterally adjacent to the attachment portions for receiving attachment portions of the downstream transfer guard member.

The transfer guard members 40 include pairs 50 of upstream transfer guard members 52 and downstream transfer guard members 54. The upstream transfer guard members 52 include transfer guard members 56 and an end transfer guard member 550. The downstream transfer guard members 54 include transfer guard members 58 and an end transfer guard member 551. As can be seen in FIG. 3, each transfer guard member 56 has a body 60 with an upper surface 62 and protrusions 64 projecting upwardly therefrom arranged in an array, such as patterned area 66. The upper surface 62 has a base surface portion 68 between the protrusions 64. The protrusions 64 have curved surfaces 65 projecting up from the base surface 68 that minimize the surface area of the upper surface 62 and thereby minimize surface contact with an object traveling across the upper surface 62. In this manner, the base surface portion 68 of the upper surface 62 extends between the protrusions 64 and is recessed from peaks 69 of the protrusions 64 such that an object may travel along the peaks 69 of the protrusions 64 without contacting the upper surface 62 which reduces frictional resistance generated by the transfer guard member 56 against movement of the object across the transfer guard member 56. (See, for example, FIG. 11 which shows base surface portion 376 recessed a distance 382 below the peak 260 of protrusion 350.)

As mentioned, the patterned area 66 minimizes the surface area of the upper surface 62 extending between the protrusions 64 by tightly packing the protrusions 64 in the patterned area 66. The patterned area 66 has a total surface area including the surfaces of the protrusions 64 and the base surface portion 68 extending between the protrusions 64. The protrusions 64 increase the surface area within a given square area of the upper surface 62 compared to an upper surface 62 without protrusions 64 protruding therefrom. The majority of the total surface area of the patterned area 66 is the curved surfaces 65 of the protrusions 64 and the upper surface 62 makes up the remaining surface area of the patterned area 66. For example, the curved surfaces 65 of the protrusions 64 may constitute, for example, at least 55%, 60%, 65%, 70%, 75%, 80%, 85%, 90%, or 95% of the total surface area of the patterned area 66.

Adhesive labels on conveyed objects have been found to be more likely to adhere to flat surfaces. Because the majority of the total surface area of the patterned area 66 is constituted by the curved surfaces 65 of the protrusions 64, the label of an object traveling across the patterned area 66 is less likely to adhere to the base surface portion 68 of the upper surface 62 than if more of the area of the patterned area 66 were flat. In this manner, the patterned area 66 including the transfer guard members 56 facilitates smooth transfer of an object across the gap 12 while, at the same time, also reduces the likelihood of a label of the object becoming adhered to the transfer guard member 56.

Figure 2:
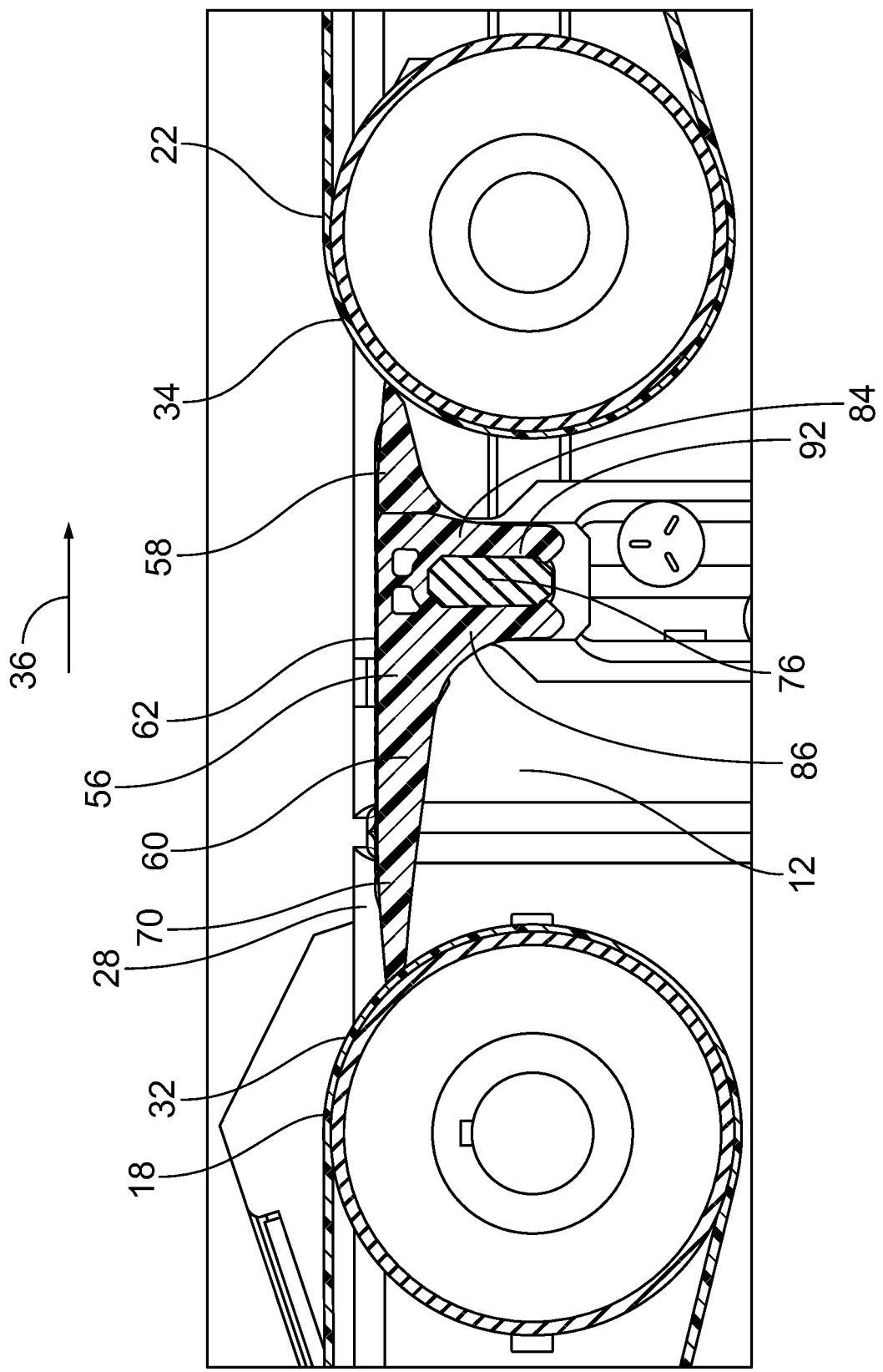
FIG. 2 is a cross-sectional view taken across line 2-2 in FIG. 1 showing an upstream transfer guard member and a downstream transfer guard member mounted to a mounting member of the transfer guard system.

Referring to FIGS. 2 and 3, the body 60 of the transfer guard member 56 includes an outboard portion 70 and one or more attachment portions, such as attachment portions 72, 74. The outboard portion 70 extends in an outboard direction away from the attachment portions 72, 74 and to the outboard edge 42. The attachment portions 72, 74 are configured to connect to an elongate mounting member, such as a mounting bar 76 (see FIG. 2). In one embodiment, the connection between the attachment portions 72, 74 and the mounting bar 76 is detachable so that the transfer guard member 56 may detach from the mounting bar 76 in response to a significant impact against the transfer guard member 56. For example, the transfer guard member 56 may detach from the mounting bar 76 upon a damaged splice contacting the outboard edge 42 such as due to damaged fasteners of the splice projecting outwardly and the other non-damaged fasteners and impacting the transfer guard member 56 in the gap 12.

Figure 4:
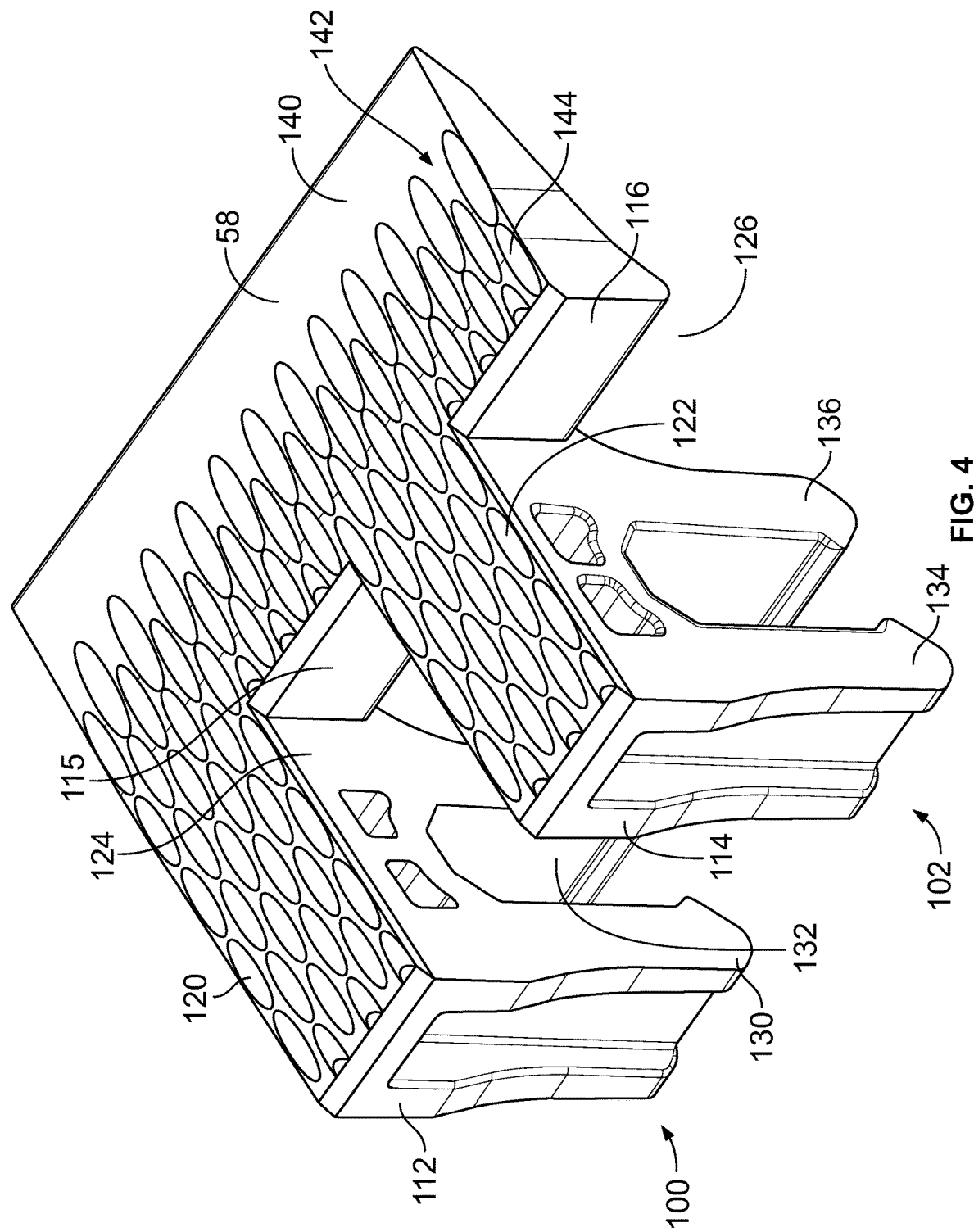
FIG. 4 is a perspective view of the downstream transfer guard member of FIG. 2 showing attachment portions and receiving recesses of the transfer guard member.

Referencing FIG. 3, the attachment portions 72, 74 include respective bridge portions 80, 82 and leg portions 84, 86 and 88, 90 depending from the bridge portions 80, 82. The leg portions 84, 86 and 88, 90 are separated by openings 92, 94 that receive the mounting bar 76. The transfer guard member 56 has one or more receiving recesses adjacent the one or more attachment portions, such as receiving recesses 96, 98, which receive attachment portions 100, 102 (see FIG. 4) of the downstream transfer guard member 56 paired with the transfer guard member 56. Referencing FIG. 4, the transfer guard member 58 has bridge portions 120, 122 and recesses 124, 126 laterally adjacent the bridge portions 120, 122. Like the transfer guard member 56, the transfer guard member 58 has two pairs of leg portions 130, 132 and 134, 136 configured to detachably connect to the mounting bar 76. The transfer guard member 58 of FIG. 4 also has an upper surface 140 and protrusions 144 in a patterned area 142 of protrusions 144 similar to the pattern 66 discussed above.

Continuing reference to FIG. 3, the attachment portions 72, 74 of the transfer guard member 56 have protrusions such as knuckles 104, 106 and recessed, vertical surfaces 108, 110 of the respective recesses 96, 98. Likewise, the transfer guard member 58 of FIG. 4 has knuckles 112, 114, and surfaces 115, 116 of the respective recesses 124, 126. With the pair 50 of transfer guard members 56, 58 connected to the mounting bar 76, the knuckles 104, 106 of the transfer guard member 56 are sized to be in interference with surfaces 115, 116 of the transfer guard member 58 and the knuckles 112, 114 of the transfer guard member 58 are sized to be in interference with the surfaces 108, 110. The interference between the transfer guard members 56, 58 urges the transfer guard members 56, 58 apart on the mounting bar 76 to minimize any slop or clearance between the transfer guard members 56, 58 and provides a rigid construct of the transfer guard members 56, 58 and the mounting bar 76.

Figure 5:
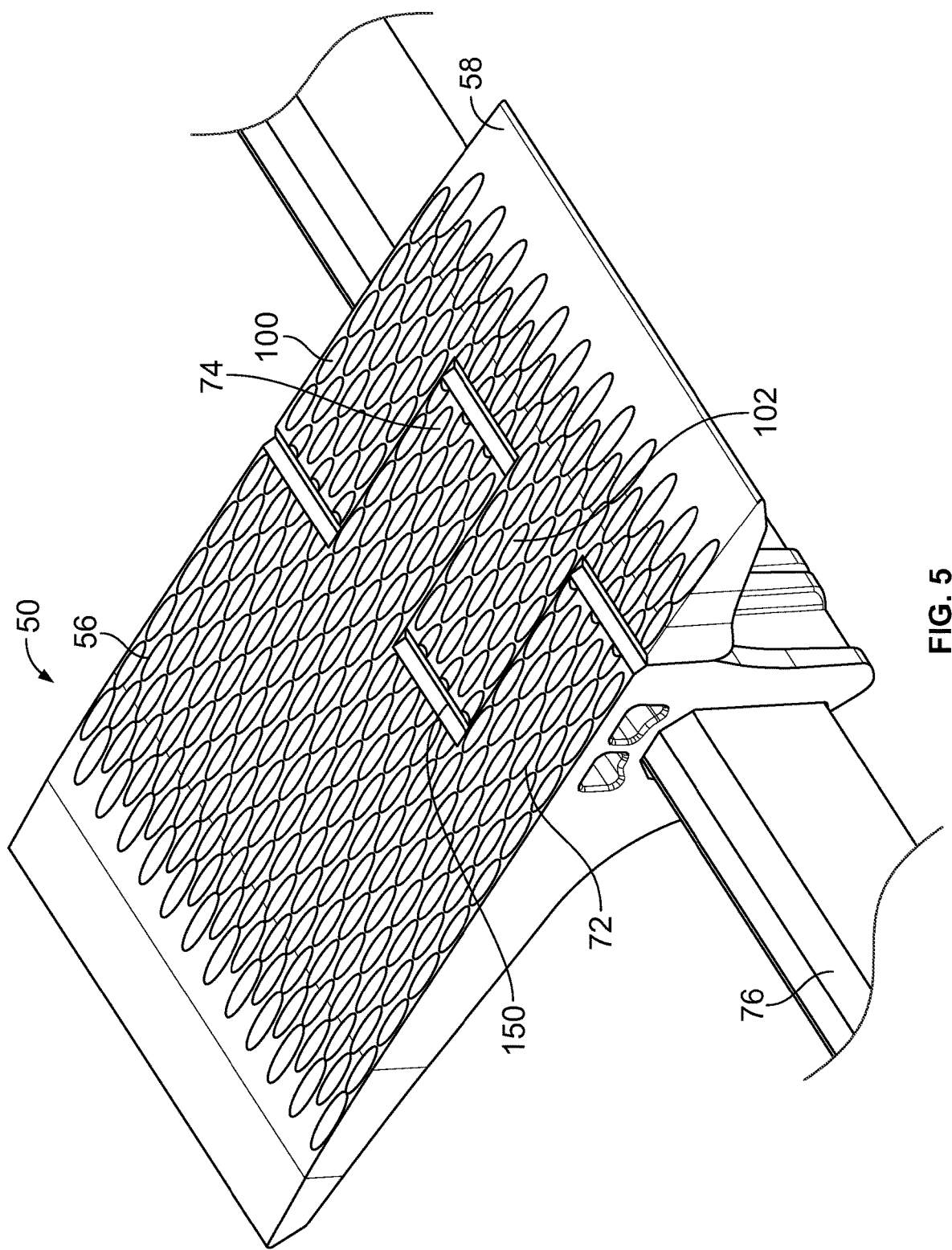
FIG. 5 is a perspective view of the upstream and downstream transfer guard members and the mounting member of FIG. 2 showing a pattern of protrusions of the upper surface of the transfer guard member that minimize friction with conveyed objects and minimizes the surface area of the upper surface.
Figure 6:
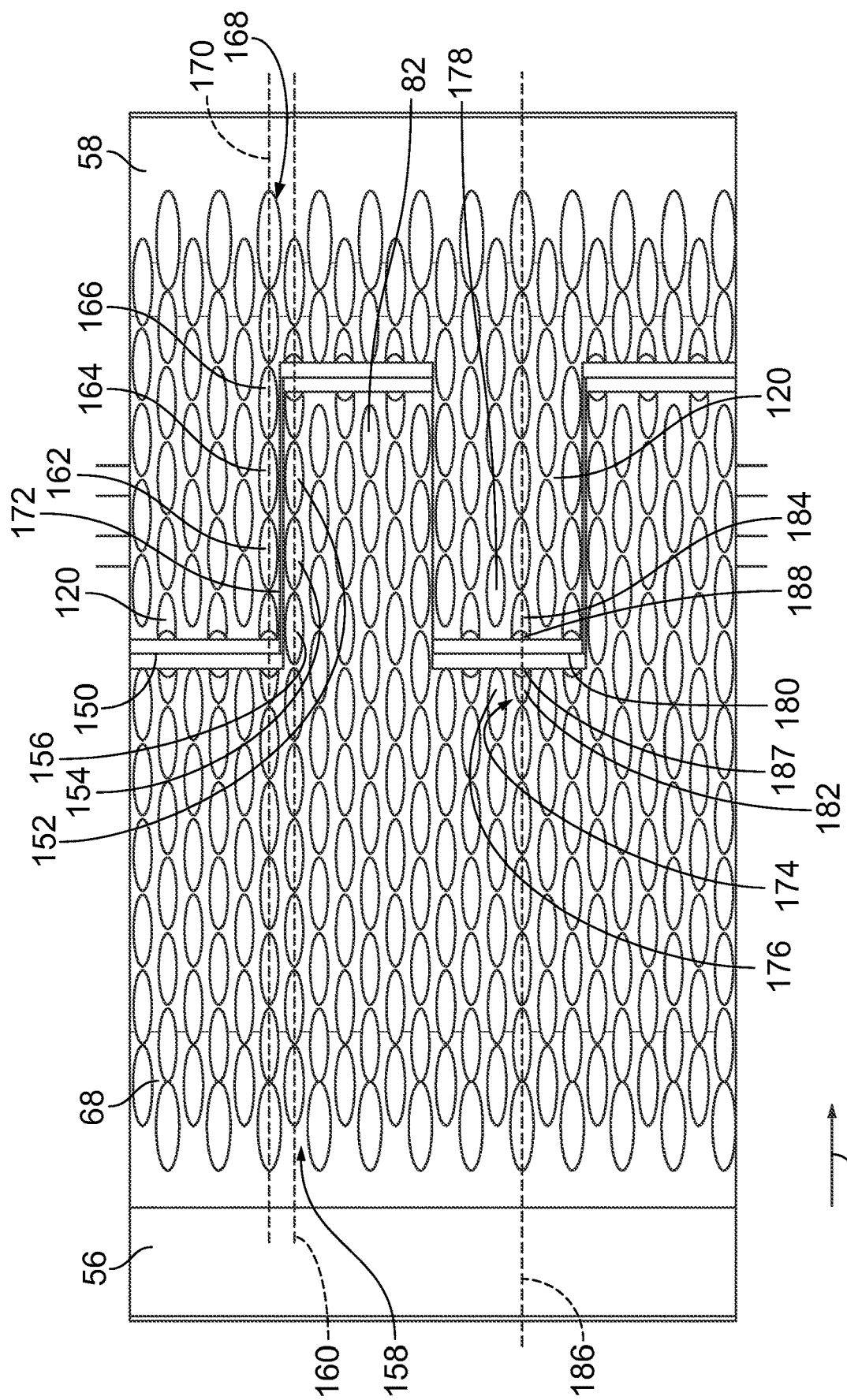
FIG. 6 is a top plan view of the pair of transfer guard members of FIG. 5 showing cooperating protrusion patterns of the transfer guard members including longitudinal columns of protrusions.

As shown in FIG. 5, the attachment portions 72, 74 and 100, 102 connect to the mounting bar 76 in an interdigitating manner that creates a crenulated seam 150 between the transfer guard members 56, 58. With reference to FIG. 6, the patterned areas 66, 142 cooperate to provide a substantially continuous series of protrusions to support an object as the object is conveyed in the downstream longitudinal direction 36. The patterned area 66 includes seam side protrusions 152, 154, 156 that are in a longitudinal column 158 and are aligned along a column or protrusion axis 160 of the columns 158. Similarly, the bridge portion 120 of the transfer guard member 58 has seam side protrusions 162, 164, 166 in a longitudinal column 168 aligned in the longitudinal direction along a column or protrusion axis 170 that is laterally adjacent to the column or protrusion axis 168. The seam side protrusions 152, 154, 156 and 162, 164, 166 provide raised contact areas immediately adjacent to and on either side of a longitudinally extending section 172 of the seam 150 to redirect an object that contacts the seam side portions 152, 154, 156 and 162, 164, 166 away from the seam longitudinally extending section 172.

The transfer guard members 56, 58 also have cooperating protrusions 174 immediately adjacent to and on opposite sides of a laterally extending section 180 of the seam 150. For example, the protrusions 174 include alternating full protrusions 176, 178 and partial protrusions 182, 184 across the seam lateral portion 180. The partial protrusions 182, 184 are aligned in the longitudinal direction along a column or protrusion axis 186 and have tapered surfaces 187, 188 that extends up from the upper surface 62 and intersects with the curved surfaces 65 of the protrusions 182, 184. Thus, unlike the full protrusions 176, 178, the partial protrusions 182, 184 lack a curved surface 65 that extends 360° thereacross down from the peak 69 to the upper surface 62. The full protrusions 176, 178 and partial protrusions 182, 184 redirect an object that contacts the full protrusions 176, 178 and partial protrusions 182, 184 away from the seam lateral portion 180.

Figure 7:
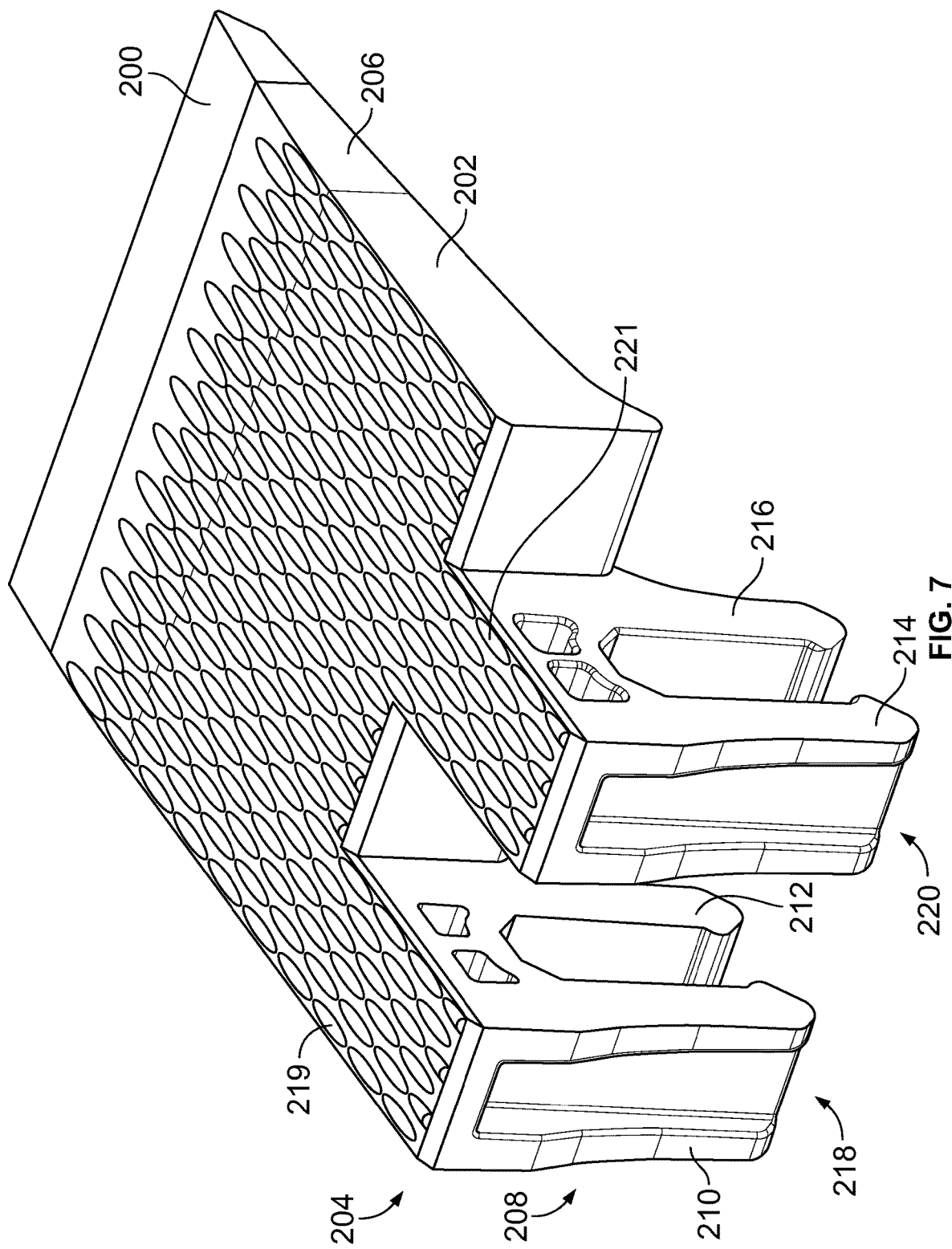
FIG. 7 is a perspective view of another transfer guard member having an upper surface with the pattern of protrusions that is similar to the patterns of the transfer guard members of FIG. 6.
Figure 8A:
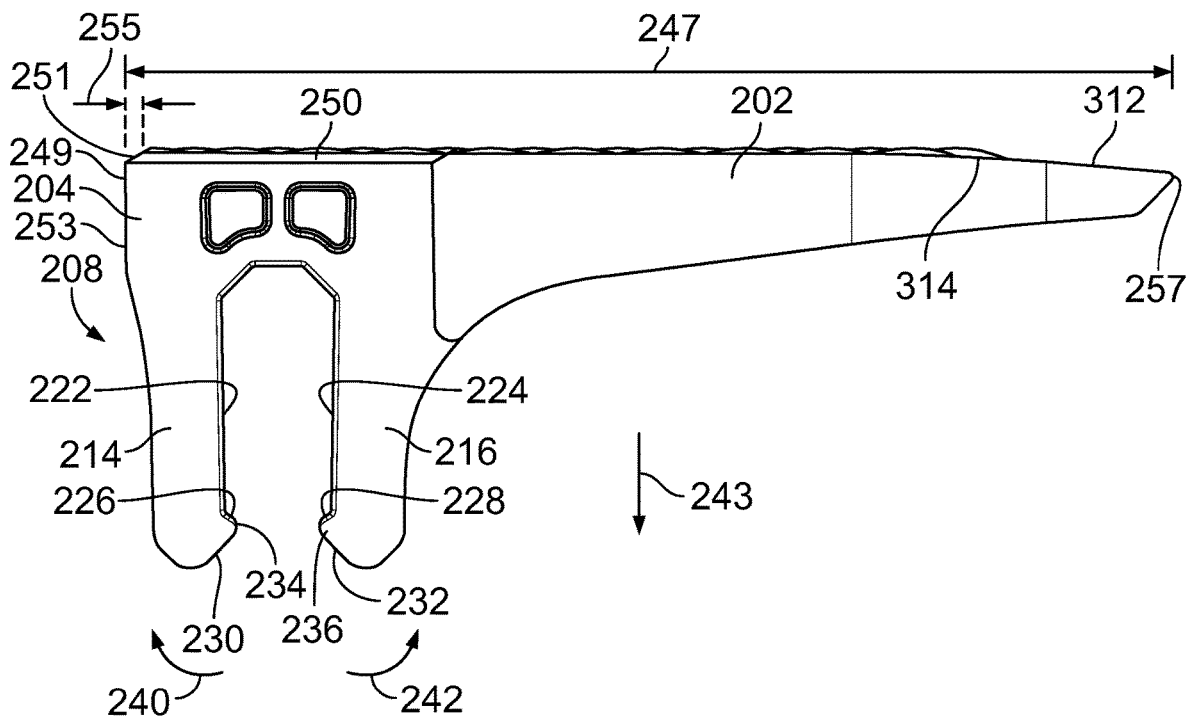
FIG. 8A is a side elevational view of the transfer guard member of FIG. 7 showing a spacing of a longitudinally inboard endmost protrusion of one of the protrusion columns from an inboard end surface portion of the attachment portion.

Referring next to FIG. 7, a transfer guard member 200 is provided that is similar in many respects to the transfer guard members discussed above. The transfer guard member 200 has a body 202 with an upper portion 204 including an outboard portion 206 and a lower portion 208 including leg portions 210, 212, 214, 216 of attachment portions 218, 220 of the transfer guard member 200. The attachment portions 218, 220 have bridge portions 219, 221 from which the leg portions 210, 212, 214, 216 depend. As can be seen in FIG. 8A, the leg portions 210, 212 and 214, 216 have surfaces 222, 224 that face one another and are configured to engage opposite sides of a mounting bar and lower projections, such as feet 234, 236, with inclined surfaces 226, 228 that engage lower surfaces of the mounting bar to resist separation of the transfer guard member 200 from the mounting bar.

Continuing reference to FIG. 8A, the feet 234, 236 have lower inclined surfaces 230, 232 configured to cammingly engage upper surfaces of the mounting bar and urge the feet 234, 236 apart in directions 240, 242 as the transfer guard is advanced in direction 243 onto the mounting bar. Once the transfer guard member 200 has been seated on the mounting bar, the leg portions 210, 212, 214, 216 resiliently urge the feet 234, 236 below the mounting bar and engage the inclined surfaces 226, 228 of the feet 234, 236 with the mounting bar.

Figure 9:
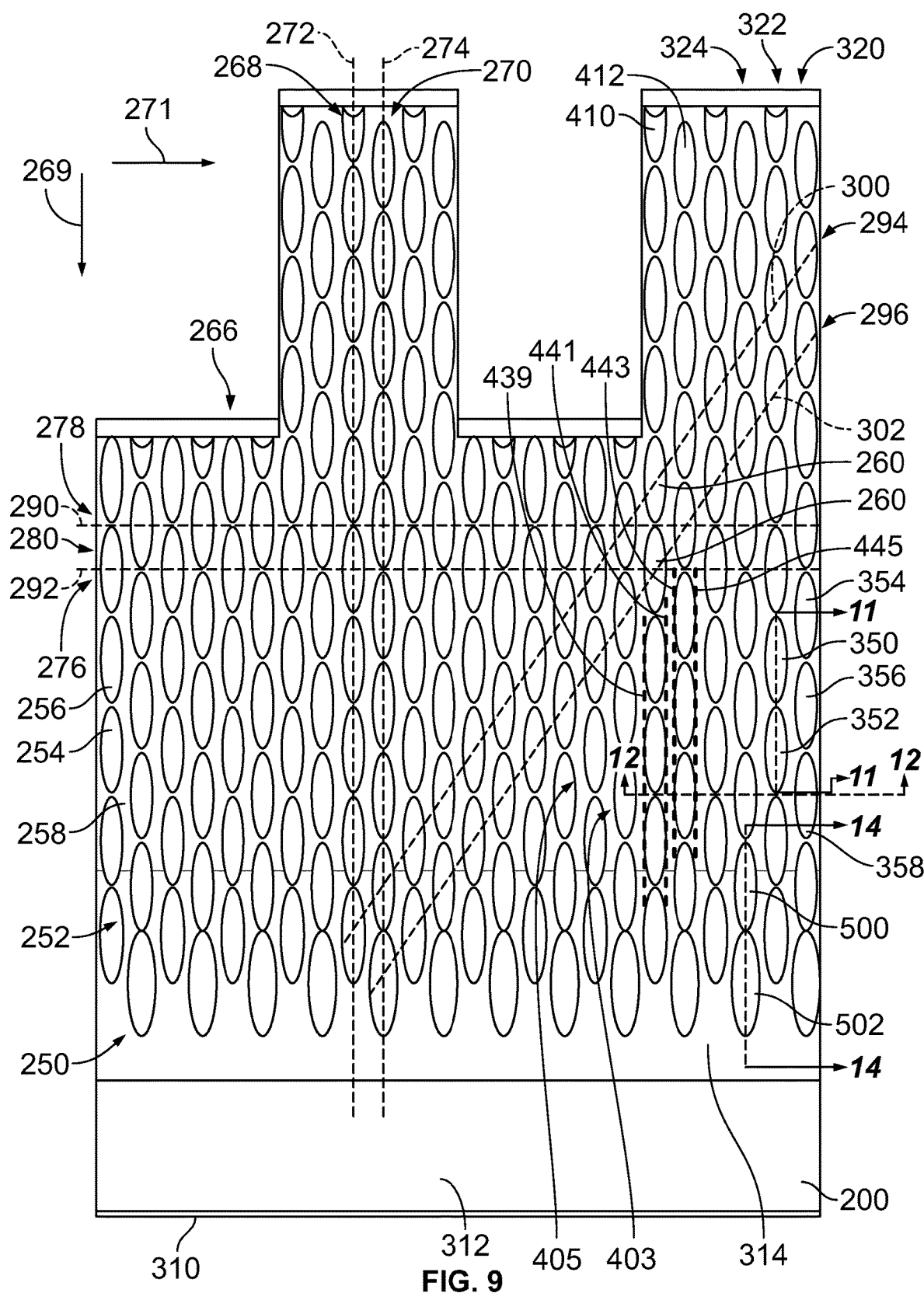
FIG. 9 is a top plan view of the transfer guard member of FIG. 7 showing the protrusion pattern having protrusions aligned along longitudinal, lateral, and diagonal axes.
Figure 11:
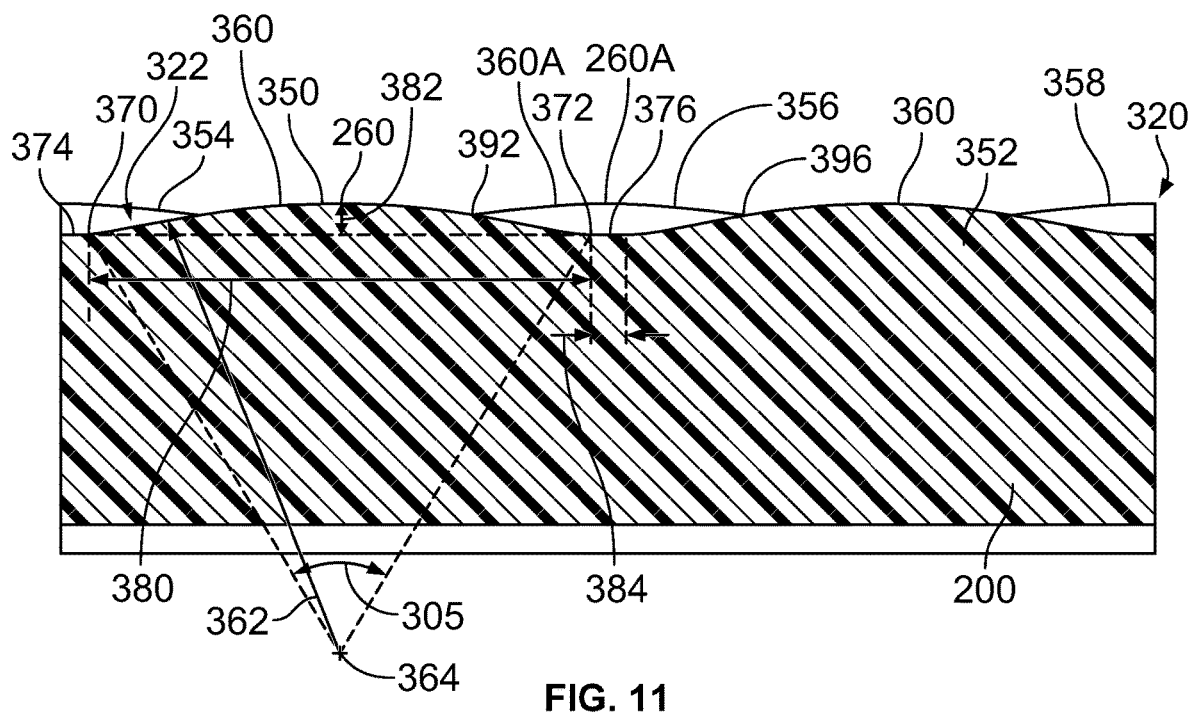
FIG. 11 is a cross-sectional view taken along line 11-11 in FIG. 9 showing a longitudinal spacing between adjacent, longitudinally aligned protrusions along the longitudinal axes.
Figure 12:
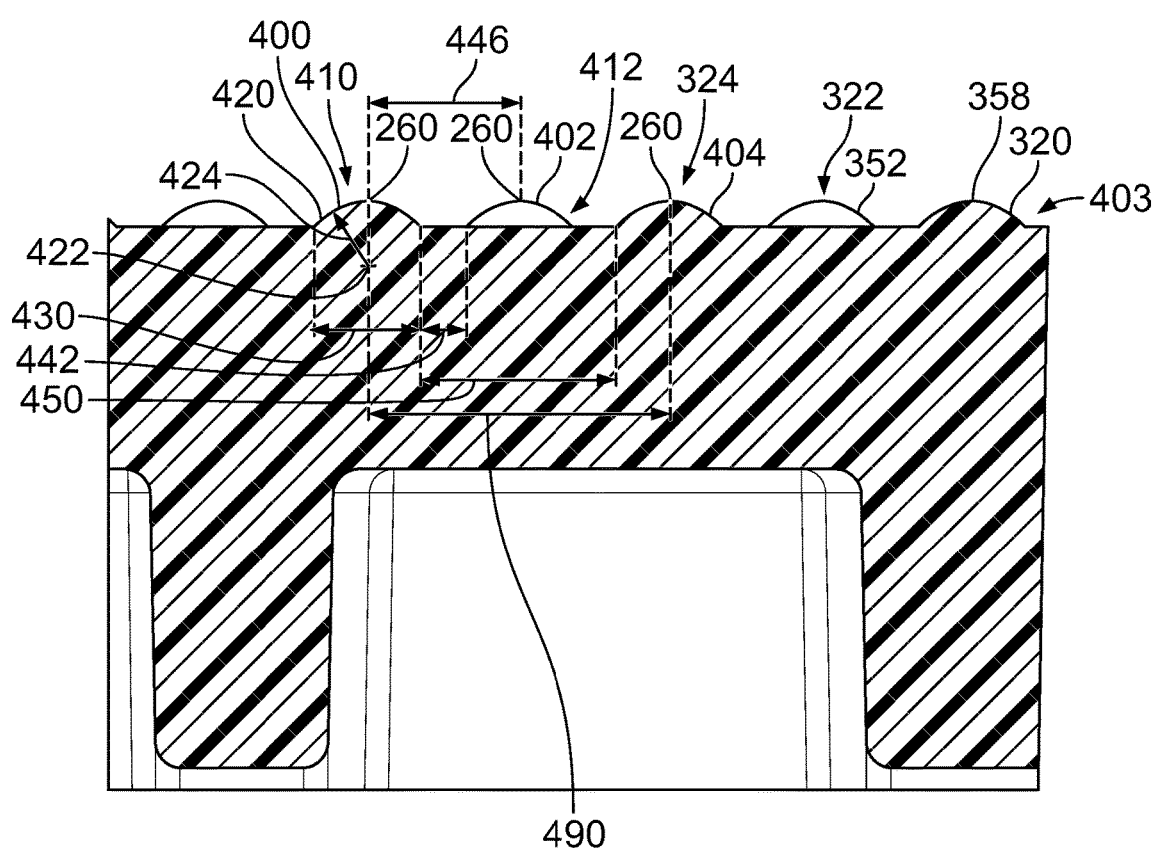
FIG. 12 is a cross-sectional view taken along line 12-12 in FIG. 9 showing a lateral spacing between laterally aligned protrusions along the lateral axes.

With reference to FIG. 9, the transfer guard member 200 has an upper surface 250 and a pattern 252 of protrusions 254 projecting upwardly from the upper surface 250. The patterned area 252 is similar to the patterned area 66, 142 discussed above and the patterned areas discussed below. It will be appreciated that the following discussion of various features of the patterned area 252 applies to the patterned areas 66, 142, and the patterned areas discussed below. The protrusions 254 have curved outer surfaces 256 that project upwardly from the upper surface 250 leaving a relatively small, flat base surface portion 258 of the upper surface 250 between the protrusions 254 extending about the bottom thereof. As shown in FIGS. 11 and 12, the protrusions 254 have peaks 260.

Returning to FIG. 9, the patterned area 252 including longitudinal columns 266 of the protrusions 254 such as longitudinal columns 268, 270 wherein the protrusions 254 of the longitudinal columns 268, 270 aligned in a first direction 269. More specifically, the protrusions 254 have peaks 260 aligned in the longitudinal direction along respective columns or protrusion axes 272, 274. The patterned area 252 includes lateral rows 276 such as lateral rows 278, 280 of protrusions 254 wherein the peaks 260 of the protrusions 254 are aligned in a second direction 271 along protrusion axes 290, 292 perpendicular to the column axes 272, 274. The patterned area 252 further includes groups of diagonally aligned protrusions 254 such as groups 294, 296 wherein the peaks 260 of the protrusions 254 in each groups 294, 296 are aligned along axes 300, 302 that extend obliquely to the protrusion axes 272, 274 and protrusion axes 290, 292. The protrusions 254 are tightly packed in the patterned area 252 such that, for two adjacent groups 294, 296 of diagonally aligned protrusions 254, each group 294, 296 has a protrusion 254 in the same longitudinal column (e.g., longitudinal column 324) as the other diagonal 294, 296. In another embodiment, the protrusion axes 272, 274 are oriented to extend at an angle greater than zero degrees, such as 10 degrees, relative to the longitudinal direction and the protrusion axes 290, 292 extend transverse to the axes 272, 274 such as extending obliquely to the protrusion axes 272, 274.

At an outboard edge 310 of the transfer guard member 200, the upper surface 250 includes an inclined surface 312 extending inboard from the outboard edge 310 to an intermediate surface portion 314 of the upper surface 250 that is less inclined than the inclined surface portion 312. The inclined surface portion 312 transitions an object on to or off of the protrusions 254 of the intermediate surface 314.

Figure 10:
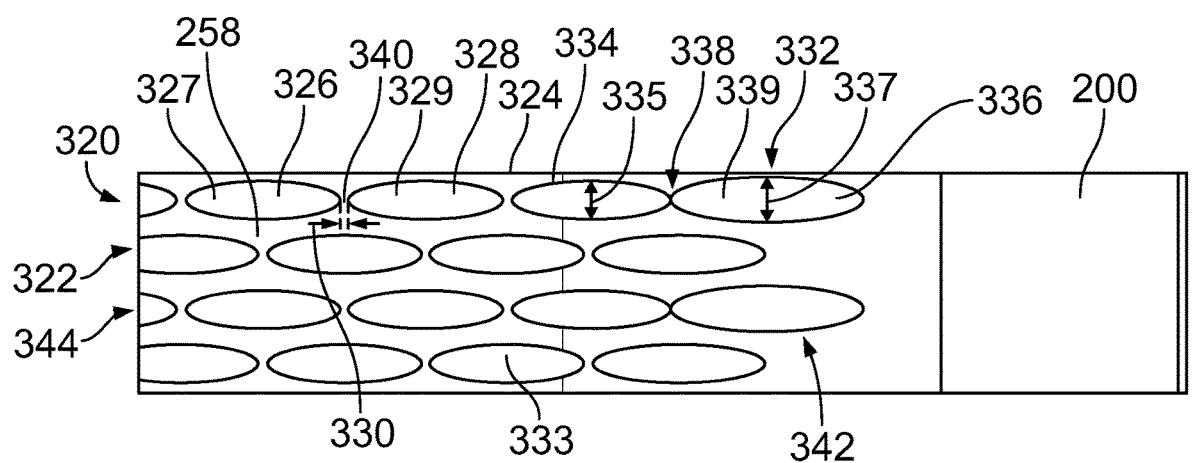
FIG. 10 is an enlarged view of a corner section of an outboard portion of the transfer guard member of FIG. 9 showing conjoined protrusions.

Referring to FIG. 10, the longitudinal columns 266 include longitudinal columns 320, 322 at a lateral side 324 of the transfer guard member 200. The longitudinal column 320 includes protrusions 326, 328 having respective curved surfaces 327, 329 that are separated by a longitudinal spacing 330. The upper surface 250 includes a longitudinal upper surface portion 340 extending between the protrusions 326, 328. The longitudinal column 320 also includes conjoined protrusions 332 at an outboard end of the longitudinal column 320. The conjoined protrusions 332 include protrusions 334, 336 having curved surfaces 333, 339 that are joined at a juncture 338 such that the protrusions 334, 336 lack a longitudinal spacing therebetween. The protrusion 334 has a lateral width 335 and the protrusion 336 has a lateral width 337 larger than the width 335. The conjoined protrusions 332 of the longitudinal column 320 cooperate with conjoined protrusions 342 of longitudinal column 344 to provide curved outboard surfaces to transition an object onto or off of the upper surface 250 of the transfer guard member 200. The longitudinal column 322 is laterally intermediate the longitudinal columns 320, 344 and may not include conjoined protrusions due to the longitudinal offset of the longitudinal column 322 from the longitudinal columns 320, 344.

Columns 320 and 322 are shown in FIG. 9, and protrusions 350, 352 of the longitudinal column 322 are shown with protrusions 354, 356, 358 of longitudinal column 320 in the background of FIG. 11. The protrusions 350, 352 each have an outer surface 360 with an outer curvature defined in part by a radius 362 taken from a center point on a lateral axis 364 extending out of the page in FIG. 11. The outer surface 360 terminates at junctures 370, 372 with longitudinal upper surface portions 374, 376. The radius 362 sweeps through an angle 305 between the junctures 370, 372 to define the outer surface 360 so that surface 360 has a constant radius of curvature 362.

The protrusion 350 has a longitudinal length 380 between the junctures 370, 372 and a height 382 above the longitudinal upper surface portions 374, 376. The flat and horizontally extending longitudinal upper surface portions 374, 376 form longitudinal spacings between the protrusion 350 and the longitudinally adjacent protrusions, such as a longitudinal spacing 384 between the protrusion 350 and the protrusion 352. The longitudinal spacing 384 is less than twice the height 382 of the protrusion 354, such as less than 1.5 times the height 382. The height 382 and longitudinal spacing 384 permits the longitudinal upper surface portions 374, 376 to be recessed and provide clearance from an object while, at the same time, limits the longitudinal extent of the longitudinal upper surface portions 374, 376. The narrow longitudinal upper surface portions 374, 376 provide a minimal flat surface area between the protrusions 254 of a longitudinal column 266 to which an adhesive label of an object may adhere.

In another form, the longitudinal spacing 384 is substantially the same as the height 382. The term substantially the same is intended to encompass dimensions of the longitudinal spacing 384 and the height 382 that are within 10% of one another. For example, the height 382 may be 0.021 inches and the longitudinal spacing 384 may be 0.022 inches.

Continuing reference to FIG. 11, as the outer surfaces 360 curve downward from peak 260 toward the longitudinal upper surface portion 376, the background protrusion 356 has an outer surface 360A that curves upwardly from a point 392 to a peak 260A that is oriented above a center of the longitudinal upper surface portion 376 before curving downwardly to a point 396 wherein the outer surface 360 of the foreground protrusion 352 extends upward beyond the outer surface 360A. Thus, although the curved surfaces 360 of the foreground protrusions 350, 352 decrease in height proximate the upper surface portion 376, the curved surface 360A of the protrusion 356 is reaching a maximum height at peak 260A. The protrusion 356 may thereby keep an adhesive label of an object contacting the protrusions 350, 352, 356 elevated above the upper surface portion 376 despite the protrusions 350, 352 decreasing in height near the upper surface portion 376.

Regarding FIG. 12, laterally adjacent protrusions 400, 402, 404, 352, 358 are shown. Protrusions 400, 404, 358 are in the same lateral row 403 while protrusions 402, 352 are in a longitudinally adjacent lateral row 405 longitudinally offset and inboard of the lateral row 403. With reference to protrusion 400, the protrusion 400 has an outer surface 420 that is curved about a radius 424 taken from a center point on a longitudinal axis 422. In this manner, the outer surface 420 of the protrusion 400 has constant radii of curvatures about both a lateral axis 364 (see, e.g., FIG. 11) and a longitudinal axis 422. The other protrusions 254 of the transfer guard member 200 likewise have outer surfaces defined by radii taken from longitudinal and lateral axes.

Referring to FIG. 13, the protrusion 400 has a maximum lateral width 430 and the outer surface 420 extends from a juncture 434 between a lateral upper surface portion 436 and the outer surface 420 to a juncture 438 with a lateral upper surface portion 440. The protrusion 400 has a lateral spacing 442 between the longitudinal column 410 and the longitudinal column 412. The longitudinal column 410 has a column width defined by a majority of the protrusions of the longitudinal column 410 measured between reference lines 439, 441 that intersect the widest portions of the majority of the protrusions. Referring to FIG. 12, the column width of the longitudinal column 410 is the maximum outer width 430 of the protrusion 400 in direction 271 which is the same outer width as a majority of the protrusions of the longitudinal column 410. The longitudinal column 412 likewise has a column width defined by a majority of the protrusions of the longitudinal column 412 and measured between reference lines 443, 445 (see FIG. 9). The column width of the longitudinal column 412 is narrower than the larger widths of the conjoined protrusions at the outboard end of the longitudinal column 412 since the majority of the protrusions of the longitudinal column 410 have a uniform width that is narrower than the widths of the conjoined protrusions. The lateral spacing 442 between the adjacent columns 410, 412 is measured between reference lines 441, 443. The lateral spacing 442 may be in the range of, for example, 0.025 to 0.05 inches, such as 0.0375 inches. The protrusions 400, 402 have a lateral spacing 446 between the peaks 260. The lateral spacing 446 may be, for example, 0.125 inch.

Further, the protrusions 400, 402 are longitudinally offset from one another such that the protrusions 400, 402 are not laterally aligned. By contrast, the protrusions 400, 404, 408 are laterally aligned and thus are in the same lateral row 403. The protrusion 400 has a lateral spacing 450 between the laterally aligned protrusions 400, 402. The lateral spacing 450 may be, for example, 0.1625 inches.

In FIG. 13, it can be seen that the protrusion 400 has a height 460 and a half-width 462. The half-width 462 may be, for example, 0.04375 inches. The height 460 may be in the range of 0.01 to 0.03 inches, such as 0.021 inches. The protrusion 400 has a line 462 extending tangent from the peak 260 laterally down to a juncture 464 between the lateral upper surface portion 440 and the outer surface 420 of the protrusion 402. The half-width 462 and the lateral spacing 442 form a distance 468 between the peak 260 of the longitudinal column 410 and the juncture 464 of the protrusion 402 of the adjacent longitudinal column 412. The distance 468 may be, for example, 0.08125 inches.

Reviewing FIGS. 12 and 13, the patterned area 252 has certain geometric properties that provide a dense arrangement of the protrusions 254 which minimizes friction with an object on the upper surface 250 while, at the same time, minimizing flat, horizontal surfaces to which labels may adhere. For example, the lateral spacing 446 between the peaks 260 is less than twice the maximum lateral width 430, such as 1.5 times or less the maximum lateral width 430. For example, the lateral spacing 446 may be 0.125 inches and the width 430 may be 0.0875 inches. Similarly, a lateral spacing 490 (see FIG. 12) between the peaks 260 of protrusions 400, 404 in the same lateral row 492 (see FIG. 9) is less than three times the maximum lateral width 430. For example, the lateral spacing 490 may be 0.25 inches and the maximum lateral width 430 may be 0.0875 inches. Further, the lateral spacing 450 between the longitudinal columns 410, 324 is less than twice the maximum lateral width 430 of the protrusion 400. For example, the lateral spacing 450 may be 0.1626 inches and the maximum lateral width 430 may be 0.0875 inches. The longitudinal columns 410, 412 are separated by the lateral spacing 442 that is less than the maximum lateral width 430 of the protrusion 400, such as approximately one-half or less of the maximum lateral width 430. For example, the lateral spacing 442 may be 0.0375 inches and the maximum width 430 may be 0.0875 inches. Still further, the longitudinal columns 410, 412 have the lateral spacing 442 therebetween that is less than the radius 424 of curvature of the outer surface 420 of the protrusion 400.

Referring next to FIG. 14, the conjoined protrusions 342 are shown which include protrusion 500 and protrusion 502 having respective outer surfaces 504 and 506 that connect at a raised juncture 508 higher than the upper surface 250. As shown in FIG. 14, there is no longitudinal upper surface portion separating the protrusions 500, 502. The transfer guard member 200 has an outboard surface portion 510 that tapers downwardly away from the outer surface 506 of the protrusion 502 as the outboard surface portion 510 extends toward the outboard edge 310 of the transfer guard member 200.

Returning temporarily to FIG. 8A, the transfer guard member 200 has an overall length 247 extending between an inboard end 249 and an outboard end 257 of the transfer guard member 200. The patterned area 252 includes closely arranged protrusions 254 projecting upwardly from the upper surface 250 as well as protrusions 254 at an inboard end 249 of the transfer guard member 200. More specifically, the transfer guard member 200 has a transition surface 251 extending for longitudinal distance 255 between the upper surface 250 and an inboard vertical end surface portion 253 of the transfer guard member 200. Thus, the upper surface 250 is offset by the longitudinal distance 255 in an outboard direction from vertical end surface portion 253 toward an outboard end 257 of the transfer guard member 250. Because the protrusions 254 are so tightly arranged on the upper surface 250, the longitudinal distance 384 (see FIG. 11) between protrusions 254 in a longitudinal column is less than the distance 255 (see FIG. 8A). For example, the longitudinal distance 384 may be 0.0224 inches and the distance 255 may be 0.0743 inches.

Figure 8B:
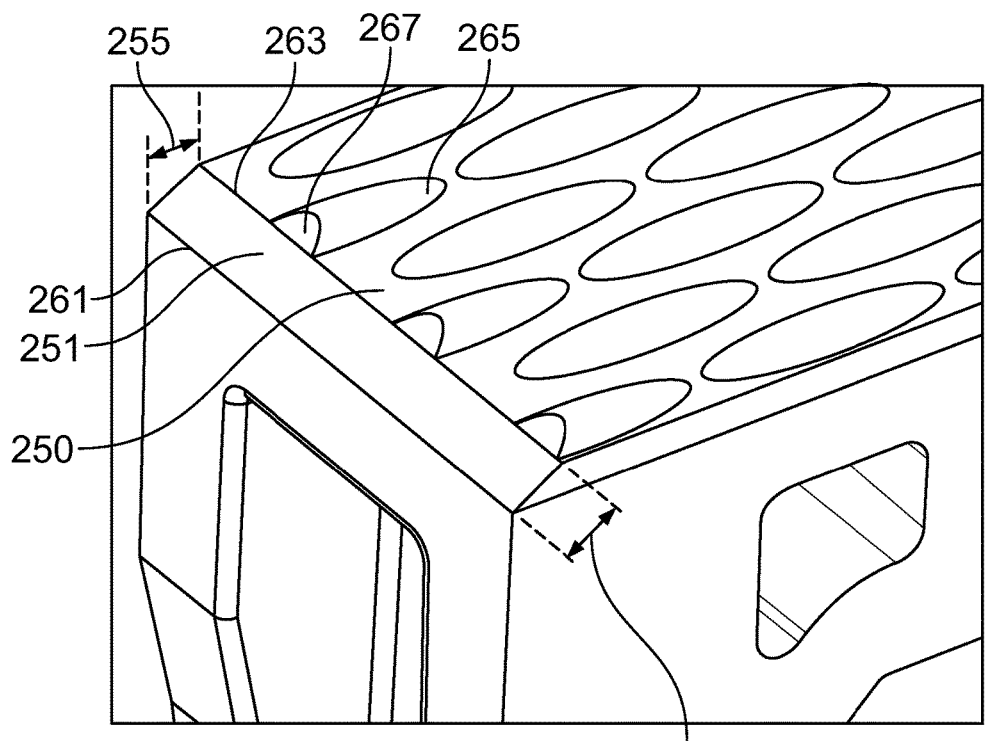
FIG. 8B is a perspective view of the dashed circled area of FIG. 3 showing an inclined surface that longitudinally spaces the upper surface of the transfer guard member from an inboard end surface portion of the attachment portion.

With reference to FIG. 8B, the transition surface 251 connects to the inboard surface portion 253 and the upper surface 250 at junctures 261, 263. The distance 255 is the longitudinal distance between the junctures 261, 263. The transition surface 251 also has a length 255A extending along the transition surface 251. The length 255A is longer than the distance 255 and may be, for example, 0.0858. The protrusions 254 include truncated or partial protrusions 265 having tapered surfaces 267 that extend upward from the juncture 263 with a taper that matches the taper of the transition surface 251. In this way, the tapered surface 267 is a continuation of the transition surface 251.

Figure 15:
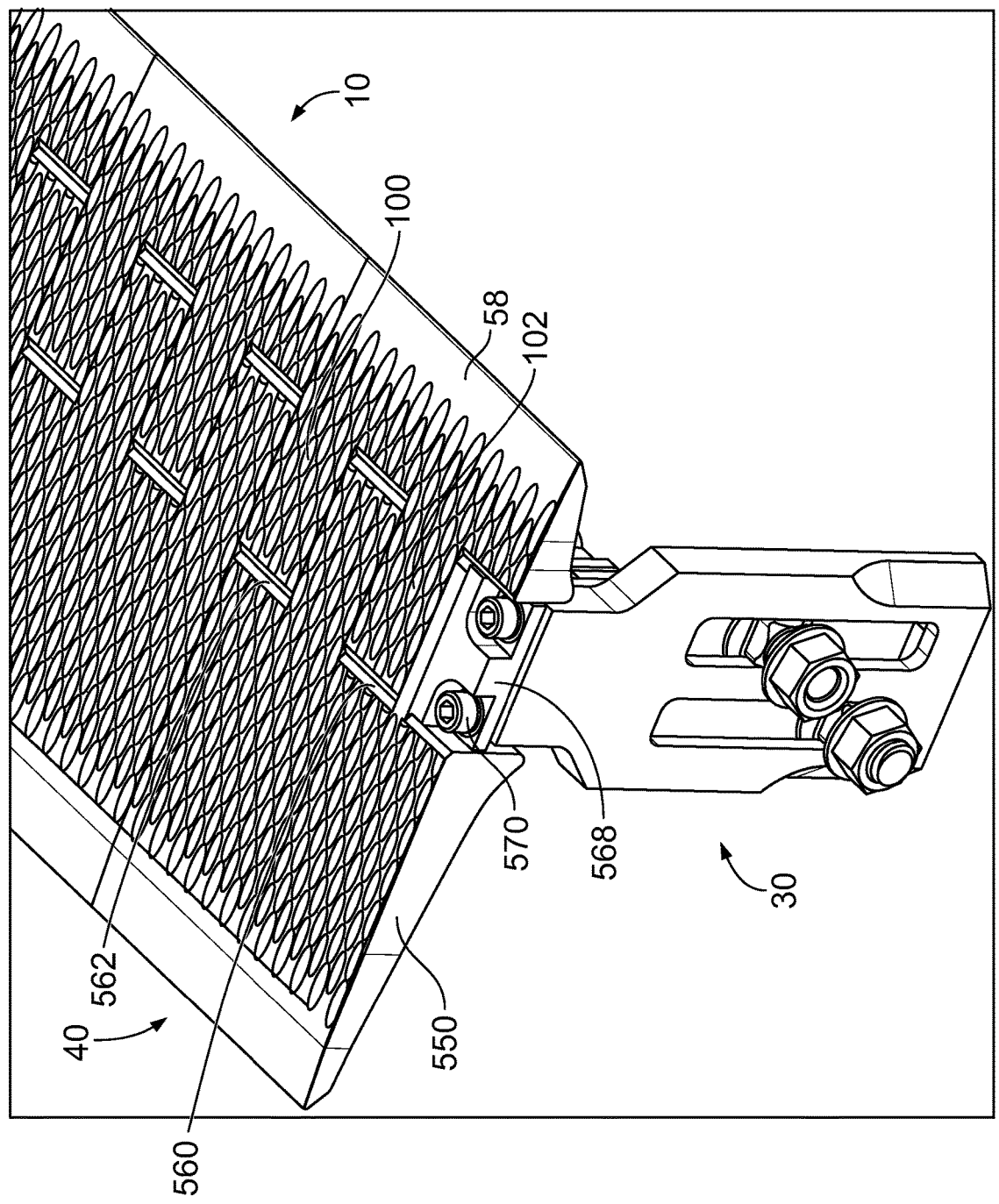
FIG. 15 is a perspective view of a mount of the transfer guard system of FIG. 1 showing a height adjustment mechanism to adjust a height of the mounting member and the transfer guard members in the gap.
Figure 16:
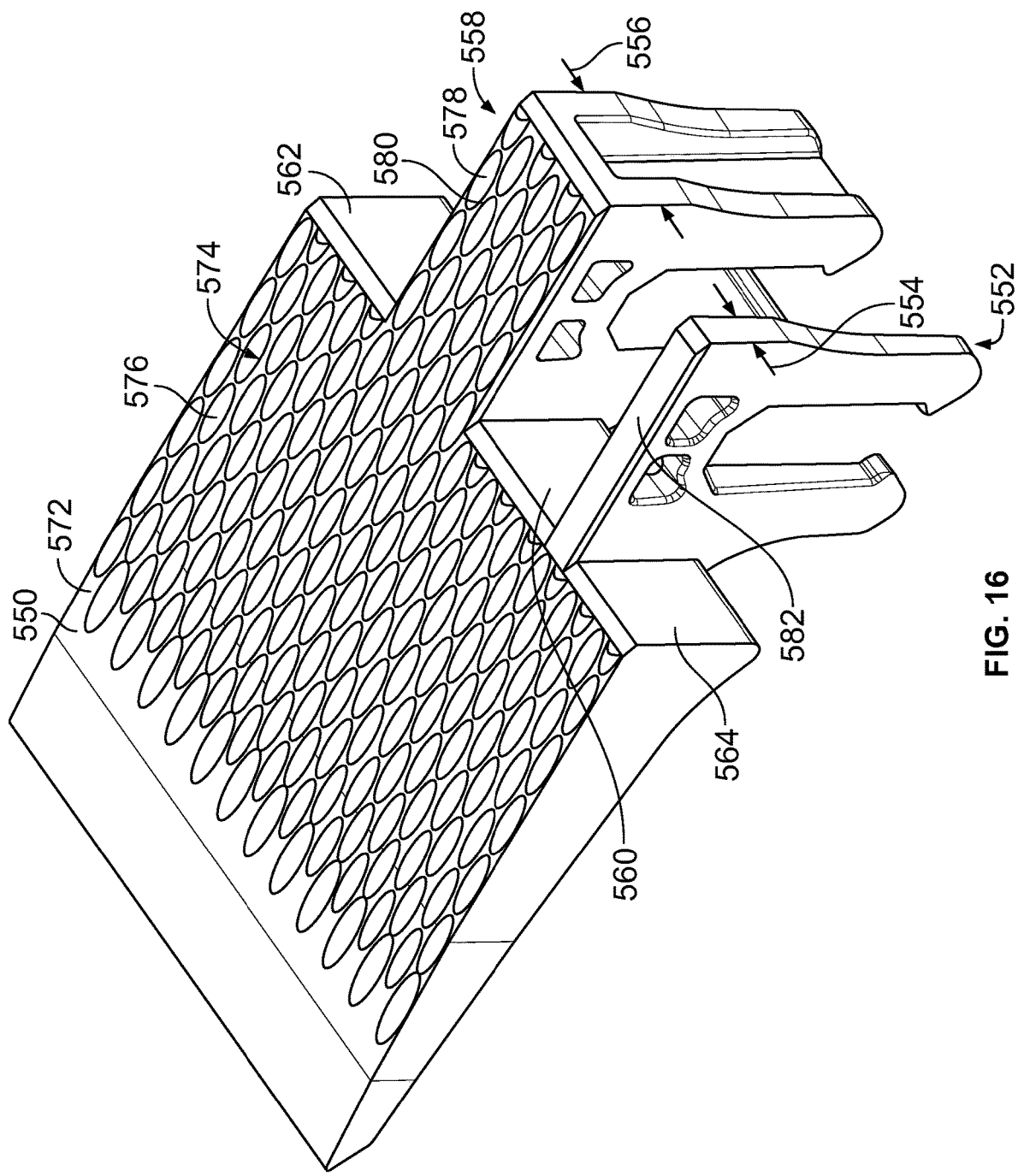
FIG. 16 is a perspective view of one of the transfer guard members of FIG. 15 proximate the height adjustment mechanism having a narrow attachment portion to provide clearance for the height adjustment mechanism.

Regarding FIG. 15, the transfer guard members 40 of the transfer guard system 10 include the end transfer guard member 550 positioned at an end of the mounting bar 76. Regarding FIGS. 15 and 16, the transfer guard member 550 has an attachment portion 552 with a width 554 that is narrower than a width 556 of another attachment portion 558 of the transfer guard member 550. The transfer guard member 550 has recesses 560, 562 to receive the attachment portions 100, 102 of the associated downstream transfer guard member 58 as well as a recess 564 to provide clearance for a plate 568 and one or more fasteners 570 of the mount 30. The transfer guard member 550 has an upper surface 572 with a patterned area 574 including protrusions 576. The patterned area 574 is similar to the patterned area 252 discussed above with respect to transfer guard member 200. The patterned area 574 includes a pattern portion 578 on a bridge portion 580 of the attachment portion 558. The attachment portion 552 has an upper surface 582 without protrusions thereon.

Figure 17:
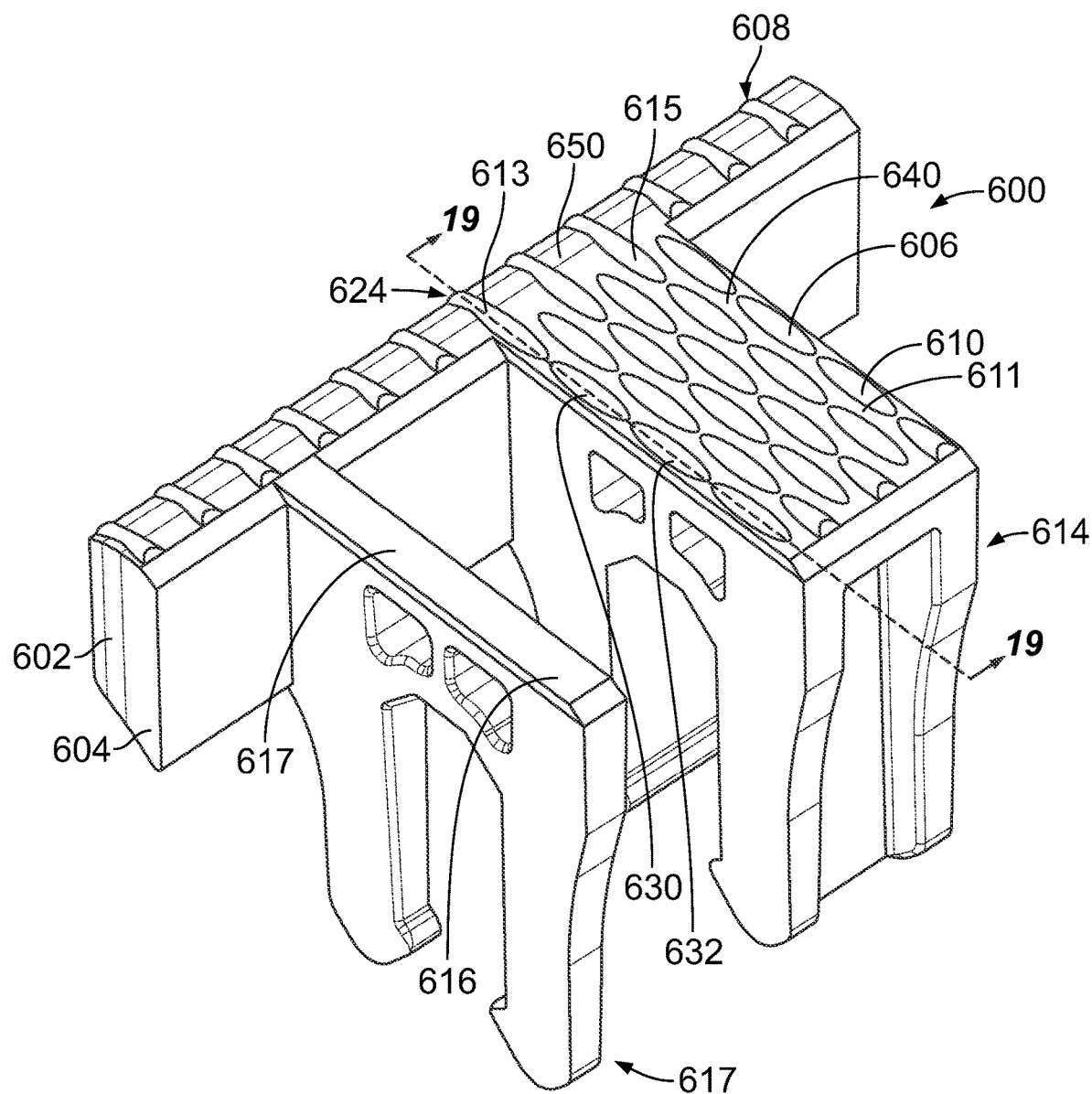
FIG. 17 is a perspective view of a transfer guard member having a short outboard portion to be positioned in proximity to a chute.

Regarding FIG. 17, a transfer guard member 600 is provided that is similar in many respects to the transfer guard members discussed such that differences will be highlighted. The transfer guard member 600 includes an outboard portion 602 configured to be positioned in proximity to a chute or other conveying surface having an abrupt end. The transfer guard member 600 has a body 604 with attachment portions 614, 616 and an upper surface 606 with a patterned area 608 including protrusions 610. The patterned area 608 is similar to the patterned area 252 discussed above.

Figure 18:
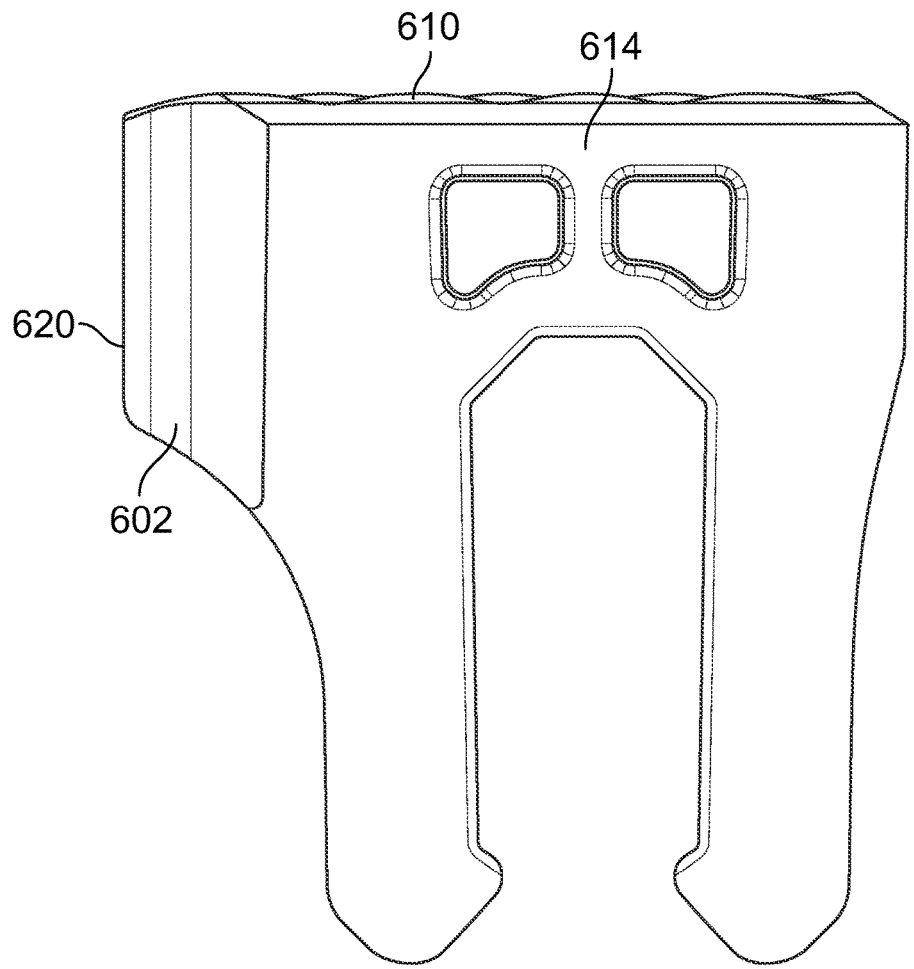
FIG. 18 is a side elevational view of the transfer guard member of FIG. 17 showing a pair of leg portions of the transfer guard member for engaging a mounting member.

The attachment portion 614 includes a bridge portion 611 with protrusions 610 thereon while the attachment portion 616 has a bridge portion 617 without protrusions 610. Regarding FIG. 18, the outboard portion 602 has a conveyor facing surface 620 that may be flat to be positioned in close proximity to a lower edge of a chute, for example.

Figure 19:
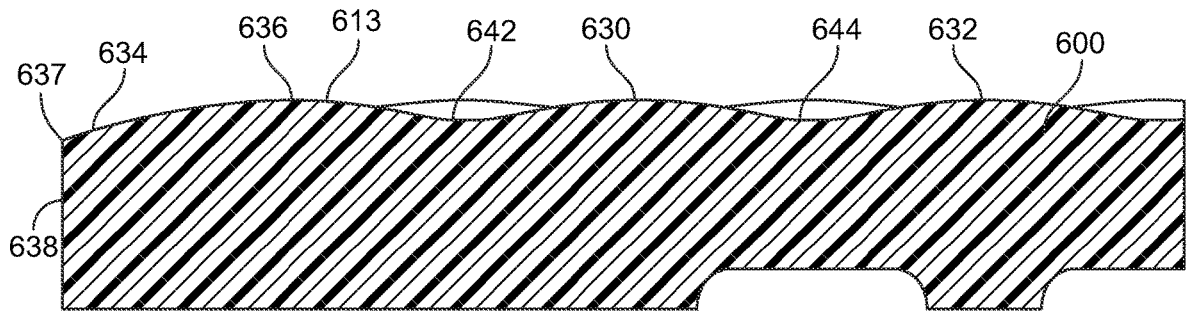
FIG. 19 is a cross-sectional view taken along line 19-19 in FIG. 17 showing longitudinally aligned protrusions of the transfer guard member including an outboard protrusion having a curved upwardly projecting surface that merges into a flat chute-facing outboard surface of the transfer guard member.

Regarding FIGS. 17 and 19, the pattern 608 includes a longitudinal column 624 having an outboard protrusion 613 aligned longitudinally with protrusions 630, 632 of the bridge portion 611. The outboard protrusion 613 has a curved outer surface 634 that curves downward from a peak 636 of the outboard protrusion 613 to a juncture 637 between the curved outer surface 634 and the conveyor facing surface 638. Further, the pattern 608 includes a base surface 640 having longitudinal base surface portions 642, 644 between the outboard protrusions 613 and the protrusions 630, 632. The longitudinal base surface portions 642, 644 are flat whereas the base surface 640 has a curved lateral surface portion 650 (see FIG. 17) extending laterally between outboard protrusions 613, 615.

Figure 20:
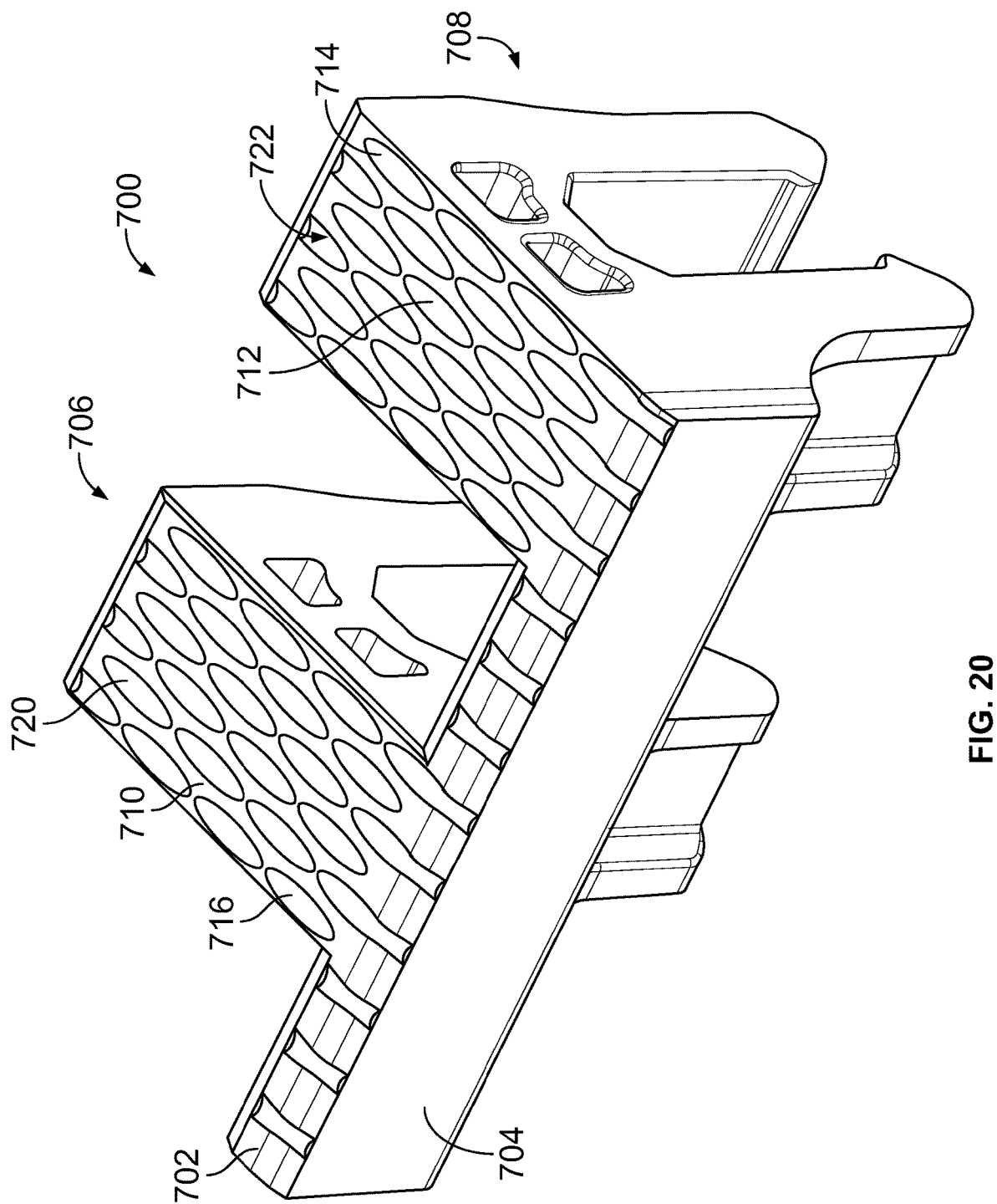
FIG. 20 is a perspective view of a transfer guard member having an outboard portion to be positioned proximate a chute and two bridge portions to connect to a mounting member, the transfer guard member having a protrusion pattern on both bridge portions.

Regarding FIG. 20, a transfer guard member 700 is provided that is similar in many respects to the transfer guard members discussed above such that differences will be highlighted. A transfer guard member 700 has an outboard portion 702 with a conveyor facing surface 704 and attachment portions 706, 708 with bridge portions 710, 712. The transfer guard member 700 includes a patterned area 714 with protrusions 716 similar to the patterned area 608 discussed above. The patterned area 714 includes pattern portions 720, 722 on the bridge portions 710, 712. Whereas the transfer guard member 600 of FIG. 17 may be positioned at a lateral end of the transfer guard system and includes recess 564 to accommodate a portion of a mount, the transfer guard member 700 of FIG. 20 may be positioned inward from the lateral ends of the mounting bar.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A transfer guard member for a transfer guard system, the transfer guard member comprising:
    a unitary, one-piece body configured to connect to an elongate mounting member;
    an upper surface of the body;
    an array of protrusions of the body to support an object, each protrusion having a curved surface projecting upwardly from the upper surface and a height above the upper surface;
    the array of protrusions including columns of the protrusions, each column of the protrusions comprising a plurality of the protrusions aligned in a first direction;
    the array of protrusions including first spacings extending in the first direction between the protrusions of each of the columns, wherein the first spacings are each less than twice the height of the protrusions;
    the array of protrusions includes second spacings extending in a second direction transverse to the first direction between adjacent columns, wherein the second spacings are each less than twice the height of the protrusions;
    wherein the curved surfaces of the protrusions each have a first radius of curvature from a first axis extending along the first direction below the upper surface; and
    wherein the curved surfaces of the protrusions have a second radius of curvature from a second axis extending along the second direction below the upper surface, the second radius of curvature being larger than the first radius of curvature.

2. The transfer guard member of claim 1 wherein the first spacings are each substantially the same as the height of the protrusions.

3. The transfer guard member of claim 1 wherein the protrusions have lengths along the first direction and widths along the second direction.

4. The transfer guard member of claim 3 wherein the length of each protrusion is greater than the width.

5. The transfer guard member of claim 3 wherein the curved surfaces of the protrusions include peaks; and
    wherein the array of protrusions includes peak spacings in the second direction between the peaks of the protrusions of the adjacent columns that are each less than twice the width of the protrusions.

6. The transfer guard member of claim 3 wherein the curved surfaces of the protrusions include peaks;
   wherein the columns include alternating columns having protrusions with peaks aligned along the second direction; and
   wherein the array of protrusions includes peak spacings between the aligned peaks that are each less than three times the width of the protrusions.

7. The transfer guard member of claim 1 wherein the protrusions have widths along the second direction; and
   wherein the array of protrusions includes spacings extending in the second direction between the adjacent columns that are each one-half or less of the width of the protrusions.

8. The transfer guard member of claim 1 wherein the curved outer surfaces of the protrusions include peaks; and
   wherein the adjacent columns of protrusions are offset from one another in the first direction so that the peak of one of the protrusions of one column is aligned in the second direction with one of the first spacings of an adjacent column.

9. The transfer guard member of claim 1 wherein the upper surface includes a flat base surface portion extending between the protrusions.

10. The transfer guard member of claim 1 wherein the protrusions of at least one of the columns of protrusions include conjoined protrusions having a juncture between curved surfaces of the conjoined protrusions so that the curved surfaces meet at the juncture.

11. The transfer guard member of claim 10 wherein the body includes an outboard edge to be positioned adjacent a conveying surface and inboard resilient legs configured to connect to the elongate mounting member; and
   wherein the conjoined protrusions include an inboard conjoined protrusion having a first length in the first direction and an outboard conjoined protrusion having a second length in the first direction longer than the first length.

12. A transfer guard member of claim 1 for a transfer guard system, the transfer guard member comprising:
   a unitary, one-piece body configured to connect to an elongate mounting member;
   an upper surface of the body;
   an array of protrusions of the body to support an object, each protrusion having a curved surface projecting upwardly from the upper surface and a height above the upper surface;
   the array of protrusions including columns of the protrusions, each column of the protrusions comprising a plurality of the protrusions aligned in a first direction;
   the array of protrusions including first spacings extending in the first direction between the protrusions of each of the columns, wherein the first spacings are each less than twice the height of the protrusions;
   the array of protrusions includes second spacings extending in a second direction transverse to the first direction between adjacent columns, wherein the second spacings are each less than twice the height of the protrusions; and
   wherein the columns of protrusions include alternating first columns with conjoined protrusions and second columns without conjoined protrusions.

13. A transfer guard member for a transfer guard system, the transfer guard member comprising:
   a unitary, one-piece body configured to connect to an elongate mounting member;
   an upper surface of the body;
   an array of protrusions of the body to support an object, each protrusion having a curved surface projecting upwardly from the upper surface and a height above the upper surface;
   the array of protrusions including columns of the protrusions, each column of the protrusions comprising a plurality of the protrusions aligned in a first direction;
   the array of protrusions including first spacings extending in the first direction between the protrusions of each of the columns, wherein the first spacings are each less than twice the height of the protrusions;
   the array of protrusions includes second spacings extending in a second direction transverse to the first direction between adjacent columns, wherein the second spacings are each less than twice the height of the protrusions; and
   wherein the body includes an outboard edge to be positioned adjacent a conveying surface;
   wherein the body has an inboard end surface portion opposite the outboard edge to contact an adjacent transfer guard member connected to the elongate mounting member, the body having an overall length between the outboard edge and the inboard end surface portion;
   wherein the upper surface is longitudinally spaced by a first longitudinal distance from the inboard end surface portion; and
   wherein the first spacings of at least one of the columns of protrusions include first spacings between the protrusions of the column that are each less than the first longitudinal distance.

14. The transfer guard member of claim 1 wherein the body includes resilient leg portions configured to be deflected relative to one another to facilitate connecting of the body to the mounting member.

15. The transfer guard member of claim 14 wherein the leg portions include projecting distal interference portions configured to engage the elongate mounting member and resist separation of the leg portions from the elongate mounting member.

16. The transfer guard member of claim 1 wherein the body includes a bridge portion and leg portions depending from the bridge portion; and
   wherein the bridge portion includes a plurality of the protrusions.

17. The transfer guard member of claim 1 wherein the body includes an outboard end surface portion to be positioned adjacent a conveying surface, an inboard end surface portion opposite the outboard surface portion, and an overall longitudinal length extending between the inboard and outboard end surface portions; and
   wherein the first direction is a longitudinal direction and the second direction is a lateral direction.

18. The transfer guard member of claim 1 wherein the first and second directions are perpendicular to one another.

19. The transfer guard member of claim 1 wherein the adjacent columns each include a column width defined by a width of a majority of the protrusions of the column in the second direction; and
   wherein the second spacings extend between the column widths of the adjacent columns.

20. A transfer guard member comprising:
   a body to be positioned in a gap of a conveyor system;
   an upper surface of the body;
   an inboard end surface portion and an outboard end surface portion of the body, the body having an overall longitudinal length extending longitudinally between the inboard and outboard end surface portions of the body;

an inboard attachment portion of the body configured to be detachably fixed to an elongate mounting member extending laterally in the gap and including the inboard end surface portion thereon;

an outboard portion of the body extending longitudinally outward from the inboard attachment portion and having the outboard end surface portion thereon with the outboard end surface portion positioned proximate a conveying surface of the conveying system with the inboard attachment portion detachably fixed to the mounting member;

a receiving recess of the body adjacent the inboard attachment portion configured for receiving an inboard attachment portion of another transfer guard member fixed to the elongate mounting member so that the upper surfaces of the transfer guard members are adjacent one another;

protrusions of the body projecting upward from the upper surface to support an object being conveyed longitudinally by the conveyor system, the protrusions being arranged in columns of the protrusions, each column of the protrusions comprising a plurality of the protrusions aligned in a first direction;

a longitudinally inboard endmost protrusion of each of the columns of the protrusions longitudinally spaced from the inboard end surface portion of the body by a longitudinal distance so that the longitudinally inboard endmost protrusions are longitudinally spaced from the other transfer guard member when the transfer guard members are fixed to the elongate mounting member; and at least one of the columns of the protrusions having first spacings extending in the first direction between the protrusions of the at least one column that are each less than the longitudinal distance between the longitudinally inboard endmost protrusion of the at least one column and the inboard end surface portion of the body.

21. The transfer guard member of claim 20 wherein the attachment portion includes an inclined surface and junctures between the inclined surface, the inboard end surface portion, and the upper surface;
wherein the inclined surface has a length extending transverse to the longitudinal distance; and
wherein the first spacings between the protrusions of the at least one column are each less than the length of the inclined surface.

22. The transfer guard member of claim 20 wherein the inboard endmost protrusions include partial protrusions each having a flat tapered surface and a curved outer surface.

23. The transfer guard member of claim 20 wherein the upper surface includes a flat base surface portion interconnecting the protrusions; and
wherein the flat base surface portion is longitudinally spaced from the inboard end surface portion by the longitudinal distance.

24. The transfer guard member of claim 20 wherein the protrusions each have a height;
wherein the columns of the protrusions include adjacent columns of the protrusions;
wherein the first spacings between the protrusions of the at least one column are each less than twice the height of the protrusions; and
wherein the adjacent columns of the protrusions have second spacings between the adjacent columns extending in a second direction transverse to the first direction between the adjacent columns of protrusions, wherein the second spacings are each less than twice the height of the protrusions.

25. The transfer guard member of claim 20 wherein at least one of the columns includes conjoined protrusions having curved outer surfaces and a juncture therebetween.

26. The transfer guard member of claim 25 wherein the conjoined protrusions include an inboard protrusion having a first length and an outboard protrusion having a second length greater than the first length.

27. The transfer guard member of claim 20 wherein the columns of protrusions include alternating columns having conjoined protrusions and columns without conjoined protrusions.

28. The transfer guard member of claim 20 wherein the outboard portion has a lateral width that is greater than a lateral width of the inboard attachment portion due to the receiving recess adjacent the inboard attachment portion.

29. The transfer guard member of claim 20 wherein the body has a unitary, one-piece construction.

30. The transfer guard member of claim 20 wherein the first direction is a longitudinal direction.

31. A transfer guard system comprising:
an elongate mounting member;
at least one mount to position the elongate mounting member to extend laterally in a gap between conveying surfaces;
transfer guard members configured to be connected to the elongate mounting member;
the transfer guard members including outboard portions to be positioned proximate conveying surfaces;
upper surfaces of the transfer guard members;
a plurality of columns of protrusions of the transfer guard members, the protrusions having rounded surfaces that project upward from the upper surfaces;
at least one of the outboard portions including conjoined protrusions of the columns of protrusions, the conjoined protrusions having a juncture between the rounded surfaces of the conjoined protrusions so that the rounded surfaces of the conjoined protrusions meet at the juncture; and
the conjoined protrusions include an inboard conjoined protrusion having a first length and an outboard conjoined protrusion having a second length longer than the first length.

32. The transfer guard system of claim 31 wherein the inboard conjoined protrusion has a first width perpendicular to the first length and the outboard conjoined protrusion has a second width perpendicular to the second length, wherein the second width is larger than the first width.

33. The transfer guard system of claim 31 wherein the outboard portions of the transfer guard members include an upstream outboard portion to be positioned adjacent an upstream conveying surface and a downstream outboard portion to be positioned adjacent a downstream conveying surface; and
wherein the conjoined protrusions include an upstream pair of conjoined protrusions of the upstream outboard portion and a downstream pair of conjoined protrusions of the downstream outboard portion.

34. The transfer guard system of claim 31 wherein the columns include a first plurality of columns including conjoined protrusions and a second plurality of columns without conjoined protrusions; and
wherein columns of the first and second pluralities of columns alternate across the transfer guard members.

35. The transfer guard system of claim 31 wherein the transfer guard members include pairs of upstream and downstream transfer guard members; and
  wherein each of the columns of protrusions include protrusions of one of the upstream transfer guard members and protrusions of one of the downstream transfer guard members.

* * * * *